United States Patent
Nam et al.

(10) Patent No.: US 11,032,828 B2
(45) Date of Patent: Jun. 8, 2021

(54) CELL RESOURCE MANAGEMENT FOR POWER EFFICIENT OPERATION

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 53 days.

(21) Appl. No.: 16/371,861

(22) Filed: Apr. 1, 2019

(65) Prior Publication Data

US 2019/0342898 A1 Nov. 7, 2019

Related U.S. Application Data

(60) Provisional application No. 62/665,961, filed on May 2, 2018.

(51) Int. Cl.
| | |
|---|---|
| *H04W 72/12* | (2009.01) |
| *H04W 76/27* | (2018.01) |
| *H04W 76/28* | (2018.01) |
| *H04W 56/00* | (2009.01) |
| *H04W 72/04* | (2009.01) |

(52) U.S. Cl.
CPC ..... *H04W 72/1205* (2013.01); *H04W 56/001* (2013.01); *H04W 72/0446* (2013.01);
(Continued)

(58) Field of Classification Search
CPC ..... H04W 72/12; H04W 56/00; H04W 72/04; H04W 76/27; H04W 76/28;
(Continued)

(56) References Cited

U.S. PATENT DOCUMENTS

| | | | | |
|---|---|---|---|---|
| 2020/0120606 A1* | 4/2020 | Beale | ................. | H04W 72/121 |
| 2020/0351729 A1* | 11/2020 | Rastegardoost | .. | H04W 36/0072 |
| 2020/0351801 A1* | 11/2020 | Jeon | .................... | H04W 52/362 |

OTHER PUBLICATIONS

International Search Report and Written Opinion—PCT/US2019/025365—ISA/EPO—dated May 21, 2019.
(Continued)

*Primary Examiner* — Kyaw Z Soe
(74) *Attorney, Agent, or Firm* — QUALCOMM Incorporated

(57) ABSTRACT

Methods, systems, and devices for wireless communications are described. A base station may signal an indication to designate resources in a slot for uplink and downlink communications with a user equipment (UE). In some cases, resources may further be designated for one or more inactive durations within the slot, where the UE enters an inactive state and the base station refrains from communicating with the UE during the inactive duration(s). Accordingly, the UE may suspend communications with the base station, enter a sleep-mode operation, refrain from monitoring downlink channels, or a combination thereof. The base station may signal this designation of resources via semi-persistent signaling, dynamic signaling, or combinations thereof. Additionally, the designation of resources may be indicated by slot format indices in a slot format table or a slot format indicator table, where the resources in the slot may include the designations of the inactive durations.

30 Claims, 18 Drawing Sheets

(52) U.S. Cl.
CPC ....... *H04W 72/1289* (2013.01); *H04W 76/27* (2018.02); *H04W 76/28* (2018.02)

(58) Field of Classification Search
CPC ........... H04W 72/0446; H04W 56/001; H04W 52/0216; H04W 72/1205; H04W 72/1289
See application file for complete search history.

(56) References Cited

OTHER PUBLICATIONS

CATT: "Outstanding Aspects of Slot Format Indication", 3GPP Draft; R1-1715815 Outstanding Aspects of Slot Format Indication, 3rd Generation Partnership Project (3GPP), Mobile Competence Centre, 650, Route Des Lucioles ; F-06921 Sophia-Antipolis Cedex, France, vol. RAN WG1, No. Nagoya, Japan; Sep. 18, 2017-Sep. 21, 2017, Sep. 17, 2017 (Sep. 17, 2017), 10 Pages, XP051339275, Retrieved from the Internet: URL: http://www.3gpp.org/ftp/Meetings_3GPP_SYNC/RAN1/Docs/ [retrieved on Sep. 17, 2017].

Ericsson: "On the Content of Group-Common PDCCH", 3GPP Draft; R1-1714415, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Aug. 21, 2017-Aug. 25, 2017, Aug. 20, 2017 (Aug. 20, 2017), 8 Pages, XP051317194, Retrieved from the Internet: URL: http://www.3gpp.org/ftp/Meetings_3GPP_SYNC/RAN1/Docs/ [retrieved on Aug. 20, 2017].

\* cited by examiner

CELL RESOURCE MANAGEMENT FOR POWER EFFICIENT OPERATION

CROSS REFERENCES

The present application for patent claims the benefit of U.S. Provisional Patent Application No. 62/665,961 by NAM et al., entitled "Cell Resource Management for Power Efficient Operation," filed May 2, 2018, assigned to the assignee hereof, and expressly incorporated by reference herein.

BACKGROUND

The following relates generally to wireless communications, and more specifically to cell resource management for power efficient operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some cases, a UE may communicate with a base station according to a configurable slot format indicated by the base station. Accordingly, the configurable slot format may indicate uplink, downlink, and flexible resources for respective communications, where the flexible resources may be utilized for either uplink or downlink transmissions based on additional signaling from the base station as needed. However, by performing different operations according to the configurable slot format (e.g., blindly monitoring downlink control resources when no control information is transmitted from the base station), the UE may inefficiently expend power.

SUMMARY

The described techniques relate to improved methods, systems, devices, and apparatuses that support cell resource management for power efficient operation. Generally, the described techniques provide for a designation of resources for uplink and downlink communications in a slot for a user equipment (UE) and a cell (e.g., a base station). In some cases, the designation of resources may further include resources corresponding to one or more inactive durations. Accordingly, the UE and the cell may communicate according to the designation of resources, where the UE may enter an inactive state during the inactive duration(s) and the cell may refrain from communicating with the UE during the inactive duration(s). For example, the UE may suspend uplink and downlink communications, refrain from monitoring for scheduled physical downlink control channel (PDCCH) occasions, or perform further operations according to a sleep-mode operation during the inactive durations. In some cases, the sleep-mode operation may be associated with a discontinuous reception (DRX) mode operation. Additionally, the cell may not schedule the UE for any uplink or downlink transmissions during the inactive durations. In some cases, the UE may receive the designation of resources via semi-persistent signaling (e.g., system information or radio resource control (RRC) signaling), dynamic signaling (e.g., slot format indicator (SFI) in a group-common PDCCH (GC-PDCCH), downlink control information (DCI), etc.), or combinations thereof. Additionally or alternatively, the designation of resources may be indicated by an index referencing a derivation of a slot format or a sequence of slot formats identified in a slot format table or by an SFI table. In some cases, the UE may exit the inactive state prior to the end of the inactivity duration(s) based on an arrival of high priority data or an indication received from a second cell.

A method of wireless communication at a UE is described. The method may include receiving a downlink/uplink (DL/UL) resource designation for a slot, where the DL/UL resource designation includes an indication of at least one inactive duration during the slot, communicating during the slot in accordance with the DL/UL resource designation, and entering an inactive state during the at least one inactive duration of the slot in accordance with the indication.

An apparatus for wireless communication at a UE is described. The apparatus may include a processor, memory in electronic communication with the processor, and instructions stored in the memory. The instructions may be executable by the processor to cause the apparatus to receive a DL/UL resource designation for a slot, where the DL/UL resource designation includes an indication of at least one inactive duration during the slot, communicate during the slot in accordance with the DL/UL resource designation, and enter an inactive state during the at least one inactive duration of the slot in accordance with the indication.

Another apparatus for wireless communication at a UE is described. The apparatus may include means for receiving a DL/UL resource designation for a slot, where the DL/UL resource designation includes an indication of at least one inactive duration during the slot, communicating during the slot in accordance with the DL/UL resource designation, and entering an inactive state during the at least one inactive duration of the slot in accordance with the indication.

A non-transitory computer-readable medium storing code for wireless communication at a UE is described. The code may include instructions executable by a processor to receive a DL/UL resource designation for a slot, where the DL/UL resource designation includes an indication of at least one inactive duration during the slot, communicate during the slot in accordance with the DL/UL resource designation, and enter an inactive state during the at least one inactive duration of the slot in accordance with the indication.

In some examples of the method, apparatuses, and non-transitory computer-readable medium described herein, entering the inactive state during the at least one inactive duration of the slot may include operations, features, means, or instructions for suspending DL/UL communications for the at least one inactive duration of the slot.

Some examples of the method, apparatuses, and non-transitory computer-readable medium described herein may further include operations, features, means, or instructions for suspending DL/UL communications includes a sleep-mode operation initiated based on the DL/UL resource designation and may be independent of additional sleep-mode operation parameters associated with a DRX operation mode.

Some examples of the method, apparatuses, and non-transitory computer-readable medium described herein may further include operations, features, means, or instructions for exiting the inactive state before an ending of the at least one inactive duration of the slot based on an availability of data for transmission having a priority above a threshold and transmitting the data whose priority may be above the threshold during the at least one inactive duration of the slot.

Some examples of the method, apparatuses, and non-transitory computer-readable medium described herein may further include operations, features, means, or instructions for monitoring at least one of a tracking reference signal (TRS), a channel state information reference signal (CSI-RS), or a synchronization signal/physical broadcast channel (SS/PBCH) block during the inactive state in order to maintain synchronization with a base station.

Some examples of the method, apparatuses, and non-transitory computer-readable medium described herein may further include operations, features, means, or instructions for receiving, from a second cell and during the at least one inactive duration of the slot, a message that the UE is to exit the inactive state in relation to communication with the first cell.

In some examples of the method, apparatuses, and non-transitory computer-readable medium described herein, receiving the DL/UL resource designation for the slot may include operations, features, means, or instructions for receiving the DL/UL resource designation via semi-persistent signaling, dynamic signaling, or combinations thereof.

In some examples of the method, apparatuses, and non-transitory computer-readable medium described herein, receiving the DL/UL resource designation for the slot may include operations, features, means, or instructions for receiving the DL/UL resource designation via RRC signaling.

In some examples of the method, apparatuses, and non-transitory computer-readable medium described herein, receiving the DL/UL resource designation for the slot may include operations, features, means, or instructions for receiving the DL/UL resource designation via broadcasted system information.

In some examples of the method, apparatuses, and non-transitory computer-readable medium described herein, receiving the DL/UL resource designation for the slot may include operations, features, means, or instructions for receiving the DL/UL resource designation via an SFI included in a GC-PDCCH or a UE-specific PDCCH.

In some examples of the method, apparatuses, and non-transitory computer-readable medium described herein, the SFI includes an index referencing a slot format or a sequence of slot formats identified in an SFI table.

In some examples of the method, apparatuses, and non-transitory computer-readable medium described herein, receiving the DL/UL resource designation for the slot may include operations, features, means, or instructions for receiving the DL/UL resource designation as an index referencing a derivation of a slot format or a sequence of slot formats identified in a slot format table.

In some examples of the method, apparatuses, and non-transitory computer-readable medium described herein, receiving the DL/UL resource designation for the slot may include operations, features, means, or instructions for receiving a UE-specific DL/UL resource designation.

In some examples of the method, apparatuses, and non-transitory computer-readable medium described herein, receiving the DL/UL resource designation for the slot may include operations, features, means, or instructions for receiving a group-specific DL/UL resource designation that may be common for each UE within a group of UEs.

In some examples of the method, apparatuses, and non-transitory computer-readable medium described herein, receiving the DL/UL resource designation for the slot may include operations, features, means, or instructions for receiving the DL/UL resource designation via a UE-specific DCI message, where a format for the DCI message may be based on the indication of the at least one inactive duration during the slot to be included with the DL/UL resource designation.

In some examples of the method, apparatuses, and non-transitory computer-readable medium described herein, entering the inactive state during the at least one inactive duration of the slot may include operations, features, means, or instructions for refraining from monitoring for scheduled PDCCH occasions during the at least one inactive duration of the slot.

In some examples of the method, apparatuses, and non-transitory computer-readable medium described herein, the UE may be not scheduled for any uplink or downlink transmissions during the at least one inactive duration of the slot.

Some examples of the method, apparatuses, and non-transitory computer-readable medium described herein may further include operations, features, means, or instructions for receiving an additional DL/UL resource designation via an SFI included in a GC-PDCCH or in a UE-specific PDCCH, where the SFI indicates an additional at least one inactive duration for one or more symbols in the slot for the additional DL/UL resource designation and overwriting the DL/UL resource designation for the slot based on receiving the additional at least one inactive duration in the additional DL/UL resource designation.

A method of wireless communication at a base station is described. The method may include transmitting to a UE a DL/UL resource designation for a slot, where the DL/UL resource designation includes an indication of at least one inactive duration during the slot, communicating with the UE during the slot in accordance with the DL/UL resource designation, and refraining to communicate with the UE during the at least one inactive duration of the slot in accordance with the DL/UL resource designation.

An apparatus for wireless communication at a base station is described. The apparatus may include a processor, memory in electronic communication with the processor, and instructions stored in the memory. The instructions may be executable by the processor to cause the apparatus to transmit to a UE a DL/UL resource designation for a slot, where the DL/UL resource designation includes an indication of at least one inactive duration during the slot, communicate with the UE during the slot in accordance with the DL/UL resource designation, and refrain to communicate with the UE during the at least one inactive duration of the slot in accordance with the DL/UL resource designation.

Another apparatus for wireless communication at a base station is described. The apparatus may include means for transmitting to a UE a DL/UL resource designation for a slot, where the DL/UL resource designation includes an indication of at least one inactive duration during the slot, communicating with the UE during the slot in accordance with the DL/UL resource designation, and refraining to communicate with the UE during the at least one inactive duration of the slot in accordance with the DL/UL resource designation.

A non-transitory computer-readable medium storing code for wireless communication at a base station is described. The code may include instructions executable by a processor to transmit to a UE a DL/UL resource designation for a slot, where the DL/UL resource designation includes an indication of at least one inactive duration during the slot, communicate with the UE during the slot in accordance with the DL/UL resource designation, and refrain to communicate with the UE during the at least one inactive duration of the slot in accordance with the DL/UL resource designation.

Some examples of the method, apparatuses, and non-transitory computer-readable medium described herein may further include operations, features, means, or instructions for coordinating with a second cell for transmission of a message to the UE from the second cell during the at least one inactive duration of the slot, the message indicating that the UE may be to exit an inactive state in relation to communication with the first cell.

In some examples of the method, apparatuses, and non-transitory computer-readable medium described herein, transmitting the DL/UL resource designation for the slot may include operations, features, means, or instructions for transmitting the DL/UL resource designation via semi-persistent signaling, dynamic signaling, or combinations thereof.

In some examples of the method, apparatuses, and non-transitory computer-readable medium described herein, transmitting the DL/UL resource designation for the slot may include operations, features, means, or instructions for transmitting the DL/UL resource designation via RRC signaling.

In some examples of the method, apparatuses, and non-transitory computer-readable medium described herein, transmitting the DL/UL resource designation for the slot may include operations, features, means, or instructions for transmitting the DL/UL resource designation via broadcasted system information.

In some examples of the method, apparatuses, and non-transitory computer-readable medium described herein, transmitting the DL/UL resource designation for the slot may include operations, features, means, or instructions for transmitting the DL/UL resource designation via an SFI included in a GC-PDCCH or in a UE-specific PDCCH.

In some examples of the method, apparatuses, and non-transitory computer-readable medium described herein, the SFI includes an index referencing a slot format or a sequence of slot formats identified in an SFI table.

In some examples of the method, apparatuses, and non-transitory computer-readable medium described herein, transmitting the DL/UL resource designation for the slot may include operations, features, means, or instructions for transmitting the DL/UL resource designation as an index referencing a derivation of a slot format or a sequence of slot formats identified in a slot format table.

In some examples of the method, apparatuses, and non-transitory computer-readable medium described herein, transmitting the DL/UL resource designation for the slot may include operations, features, means, or instructions for transmitting a UE-specific DL/UL resource designation.

In some examples of the method, apparatuses, and non-transitory computer-readable medium described herein, transmitting the DL/UL resource designation for the slot may include operations, features, means, or instructions for transmitting a group-specific DL/UL resource designation that may be common for each UE within a group of UEs.

In some examples of the method, apparatuses, and non-transitory computer-readable medium described herein, transmitting the DL/UL resource designation for the slot may include operations, features, means, or instructions for transmitting the DL/UL resource designation via a UE-specific DCI message, where a format for the DCI may be based on the DL/UL resource designation including the indication of the at least one inactive duration during the slot.

In some examples of the method, apparatuses, and non-transitory computer-readable medium described herein, the refraining to communicate includes not scheduling the UE for any uplink or downlink transmissions during the at least one inactive duration of the slot.

Some examples of the method, apparatuses, and non-transitory computer-readable medium described herein may further include operations, features, means, or instructions for transmitting an additional DL/UL resource designation via an SFI included in a GC-PDCCH or in a UE-specific PDCCH, where the SFI indicates an additional at least one inactive duration for one or more symbols in the slot that overwrites the DL/UL resource designation for corresponding symbols.

DETAILED DESCRIPTION

Figure 1:
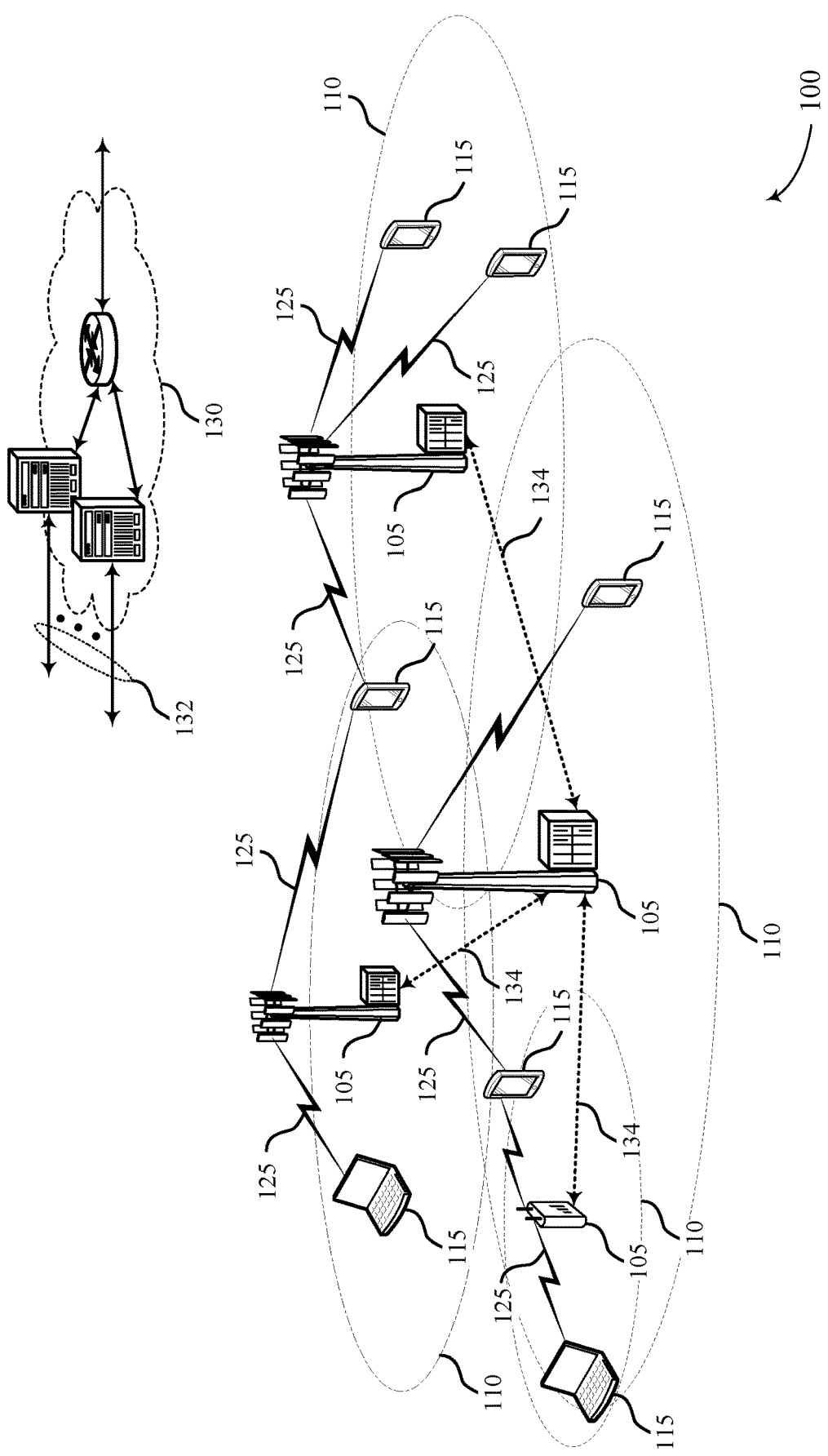
FIG. 1 illustrates an example of a system for wireless communications that supports cell resource management for power efficient operation in accordance with aspects of the present disclosure.

In some wireless communications system (e.g., New Radio (NR)), a base station may designate different resources in a slot as uplink, downlink, or flexible resources through higher layer signaling of corresponding slot format configurations as defined by a slot format table. Accordingly, a user equipment (UE) and the base station may utilize the resources based on their respective designation according to the signaled slot format configuration. For example, in the slot format configuration, the uplink resources may be utilized for uplink transmissions, the downlink resources may be utilized for downlink transmissions, and the flexible resources may be utilized for either uplink or downlink transmissions based on additional signaling from the base station (e.g., downlink resources if additional downlink transmissions are sent, or uplink resources if additional uplink transmissions are sent). In addition or as an alternative to signaling the slot format configuration based on higher layer signaling, the base station may signal an indication of a single slot format or a sequence (e.g., for a multi-slot indication) of slot formats dynamically based on a slot format indicator (SFI) table specific to the UE, where the slot formats are derived from the slot format table. However, the current configurations and indication for the slot formats may consume processing power at the UE when no signaling is transmitted from the base station or is intended for the UE.

As described herein, additional slot formats may be configured that include 'null' symbols (e.g., inactive symbols), where the UE assumes no transmission or reception during the corresponding symbols. For example, the UE may not monitor for downlink control signaling, may not be scheduled for uplink transmissions, may not receive or transmit control signaling and data channels, etc., during the 'null' symbols. Accordingly, the UE may perform a power saving operation (e.g., a planned power saving operation) to reduce power consumption and extend battery life. In some cases, new slot formats in the slot format table may include the 'null' symbols alongside the previously existing uplink, downlink, and flexible symbols. Additionally or alternatively, new slot formats may be derived from existing slot formats, where 'null' symbols replace uplink symbols, downlink symbols, flexible symbols, or combinations thereof. The slot format configurations may be signaled to the UE semi-persistently (e.g., via system information or radio resource control (RRC) signaling), dynamically (e.g., based on SFI signaling or group common downlink control signaling), or by a UE-specific downlink control information (DCI) format.

Aspects of the disclosure are initially described in the context of a wireless communications system. Additional aspects of the disclosure are provided through another wireless communications system, a slot format reconfiguration, and process flows. Aspects of the disclosure are further illustrated by and described with reference to apparatus diagrams, system diagrams, and flowcharts that relate to cell resource management for power efficient operation.

FIG. 1 illustrates an example of a wireless communications system 100 that supports cell resource management for power efficient operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a number of antenna elements of an antenna array, or by processing received signals according to different receive beamforming weight sets applied to signals received at a number of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems (e.g., NR), specific resources in a slot may be designated for downlink communications, and specific resources in the slot may be designated for uplink communications. A base station 105 may signal these resource designations semi-statically and/or dynamically as a slot format to a UE 115. For example, the base station 105 may semi-statically signal the slot format to the UE 115 in a cell-specific and/or UE-specific RRC configuration. Additionally or alternatively, the base station 105 may dynamically signal the slot format through an SFI in a group common physical downlink control channel (GC-PDCCH) message. Each slot format may include different states for resources in the slot consisting of downlink, uplink, and flexible resources, where a resource may be utilized according to their state. For example, the downlink resources (e.g., "D" resources) may be utilized for transmitting/receiving downlink messages, the uplink resources (e.g., "U" resources) may be utilized for transmitting/receiving uplink messages, and the flexible resources (e.g., "X" resources) may be utilized for transmitting/receiving either uplink or downlink messages (e.g., as needed) based on additional signaling from the base station 105. As such, in some cases, the resources designated as flexible in the semi-static signaling may be overwritten to downlink or uplink resources by the dynamic signaling.

The slot formats including the downlink, uplink, and flexible resources may be defined according to a slot format table. For example, each entry (e.g., row) in the slot format table may indicate a format of a single slot for symbols in the slot (e.g., 14 symbols). Accordingly, each slot format may be indicated by a separate format index. Table 1 may illustrate the different slot formats that the base station 105 and UE 115 may utilize and the corresponding format index.

TABLE 1

Slot Formats

| Format Index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |

TABLE 1-continued

Slot Formats

| Format Index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 9  | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | U | D | D | D | D | D | X | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | D | D | D | D | D | D | D | D |
| 55 | D | D | X | X | X | U | U | U | D | D | D | D | D | D |
| 56-255 | Reserved | | | | | | | | | | | | | |

In some cases, the base station 105 may signal a single slot format or sequence of slot formats (e.g., for a multi-slot configuration) to the UE 115 for communications based on an indicated format index semi-statically (e.g., broadcasted system information or RRC signaling). Additionally or alternatively, the base station 105 may signal a single slot format or sequence of slot formats (e.g., for a multi-slot indication) to the UE 115 through an SFI table, where the SFI table is configured specifically to the UE 115 via higher layer signaling (e.g., RRC signaling). As such, for example, each entry of the SFI table may consist of a single or sequence of single slot formats (e.g., via the format indices from the slot format table). A GC-PDCCH message may then indicate an entry index within the SFI table (e.g., an SFI index) for the slot format(s) that the UE 115 utilizes for subsequent communications. In some cases, the GC-PDCCH may overwrite a previously signaled slot format (e.g., via semi-static signaling).

The configurable slot formats (e.g., either via the semi-persistent or dynamic signaling) may provide a dynamic and efficient technique for adapting resources to time-varying conditions. For example, the base station 105 may dynamically adjust the portion of resources designated for uplink and downlink based on uplink/downlink traffic loads. During downlink, uplink, and flexible durations indicated in the slot formats, the UE 115 may perform different operations based on the respective designation. For example, during downlink durations, the UE 115 may monitor PDCCH, measure channel state information reference signals (CSI-RSs), receive physical downlink shared channel (PDSCH) messages, etc. Additionally or alternatively, during uplink durations, the UE 115 may transmit sounding reference signals (SRSs), transmit physical uplink control channel (PUCCH) or physical uplink shared channel (PUSCH) messages, transmit random access channel (RACH) messages, etc. However, in some cases, the base station 105 may not signal any downlink information to the UE 115 during the downlink durations, for example, when there is no downlink traffic for the UE 115 or when the base station 105 is already serving other UEs 115 that cannot be co-scheduled with the UE 115 due to a beam forming constraint. In such cases, the UE 115 may waste power monitoring the PDCCH, attempting to measure non-existent CSI-RSs, or remaining in an active state during the uplink durations.

Wireless communications system 100 may support efficient techniques for employing a power saving operation (e.g., planned power saving operation) at a UE 115 by including inactive durations in slot format configurations, where the UE 115 is not required to perform any operations. For example, the UE 115 may perform the power saving operation during the inactive durations and, accordingly, may not monitor PDCCH, may not be scheduled with PDSCH/PUSCH, may not receive or transmit any reference signal, or may not transmit PUCCH messages. In some cases, new slot formats in the slot format table may be defined with uplink, downlink, flexible, and null resources, where the null resources indicate the inactive durations for the UE 115. As in Table 1, format indices 56-255 are currently reserved (e.g., not being used for current slot formats) and may be utilized for the newly defined slot formats. Additionally or alternatively, slot formats including the null resources (e.g., inactive durations) may be derived based on existing slot formats, where downlink resources, uplink resources, flexible resources, or combinations thereof may be overwritten as null resources. A base station 105 may signal the new slot formats semi-statically (e.g., via broadcasted system information or RRC signaling), dynamically (e.g., SFI and GC-PDCCH), or by a UE-specific DCI format.

Figure 2:
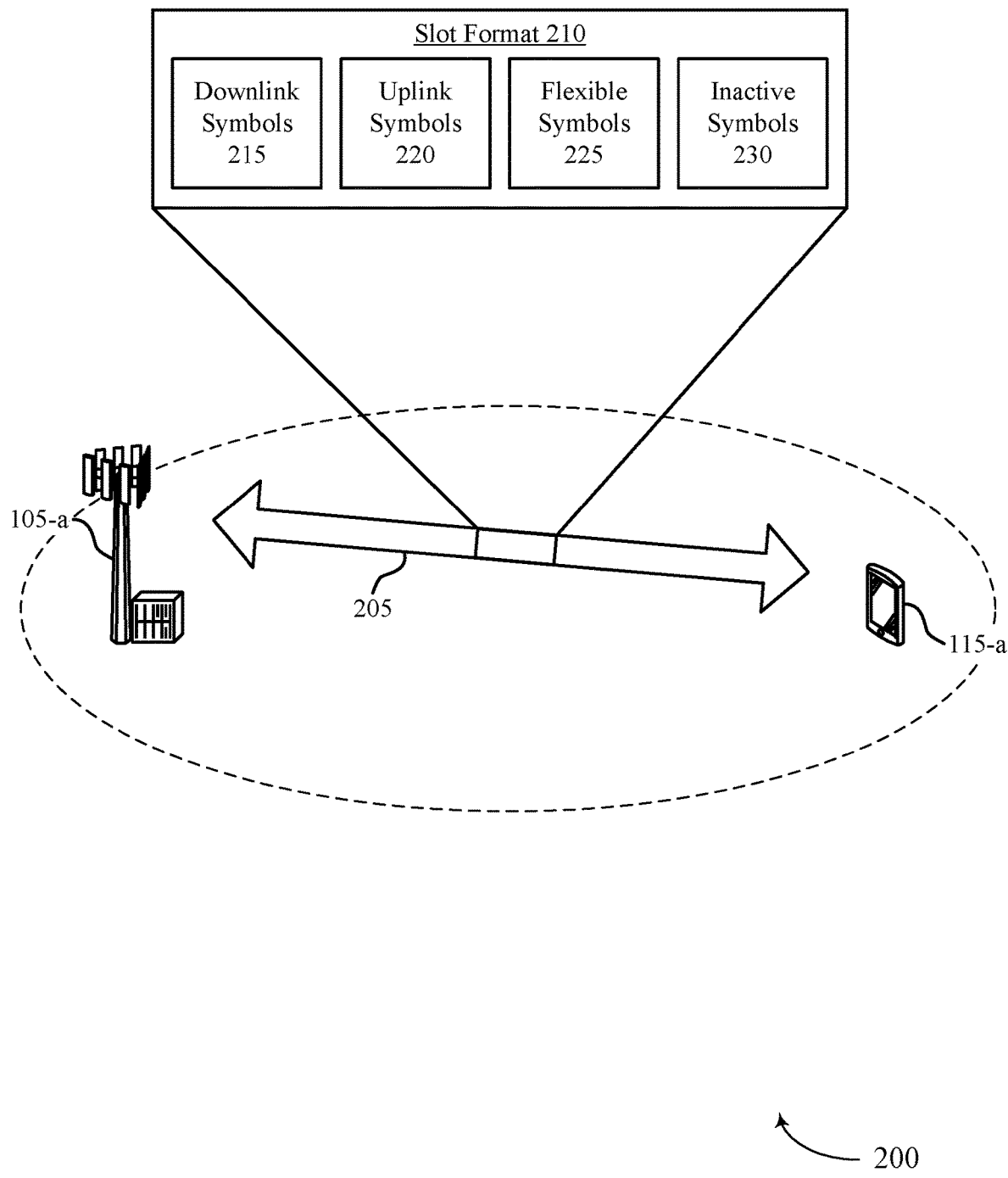
FIG. 2 illustrates an example of a wireless communications system that supports cell resource management for power efficient operation in accordance with aspects of the present disclosure.

FIG. 2 illustrates an example of a wireless communications system 200 that supports cell resource management for power efficient operation in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115 as described herein with reference to FIG. 1. Base station 105-a and UE 115-a may communicate on resources of a carrier 205. As described herein, base station 105-a may indicate a slot format 210 for the communications on carrier 205, where slot format 210 includes a number of downlink symbols 215, uplink symbols 220, flexible symbols 225, inactive symbols 230, or combinations thereof.

Through the use of inactive symbols 230, slot format 210 may support on/off control of slots in serving cells (e.g., primary and secondary cells in a CA scenario). In some cases, inactive symbols 230 may be indicated by a 'null' symbol state. For null symbol states, UE 115-a may assume that there is no transmission or reception in the corresponding symbol(s). Accordingly, UE 115-a may suspend uplink and downlink communications during the null symbols. In some cases, UE 115-a may further perform a sleep-mode operation during durations where inactive symbols 230 are indicated. This sleep-mode operation may include a planned power saving operation for UE 115-a, where, unlike different sleep operations based on configured discontinuous reception (DRX) mode operation cycles, sleep decisions (e.g., based on an inactivity timer) or wake-up procedures may not be required at UE 115-a.

Additionally, according to the planned power saving operation, if an inactive symbol 230 is indicated for at least one symbol configured for a PDCCH monitoring occasion, UE 115-a may not be expected to monitor the PDCCH. As such, if the same symbol had been indicated for a downlink symbol 215, UE 115-a may have performed PDCCH monitoring during the downlink symbol 215, even when there is no PDCCH transmission from base station 105-a, which may consume baseband processing power for UE 115-a. Additionally, during inactive symbols 230, UE 115-a may not be expected to be scheduled with downlink/uplink (DL/UL) data channels (e.g., PDSCH/PUSCH), whereas if the symbols had been indicated as flexible symbols 225, UE 115-a may be scheduled with DL/UL data channels and, accordingly, be prepared to receive/transmit. Similarly, during inactive symbols 230, UE 115-a may not be expected to receive or transmit any reference signal (e.g., CSI-RS and SRS), nor may UE 115-a be expected to transmit uplink control information (e.g., PUCCH) during inactive symbols 230. Alternatively, in some cases, urgent traffic (e.g., ultra-reliable low latency communications (URLLC) or grant-free uplink transmissions) may be transmitted or received during inactive symbols 230. In some other cases, UE 115-a may monitor a tracking reference signal (TRS), a CSI-RS, or a synchronization signal/physical broadcast channel (SS/PBCH) block to maintain synchronization to the base station 105-a during inactive symbols 230.

Base station 105-a may indicate slot format 210 to UE 115-a through semi-persistent signaling (e.g., RRC signaling), dynamic signaling (e.g., SFI and GC-PDCCH), or a combination thereof. For example, available format index entries in a slot format table (e.g., Table 1) may be used for slot formats 210 including inactive symbols 230 and signaled to UE 115-a semi-persistently or dynamically. Additionally or alternatively, slot formats 210 may be derived from an existing format in the slot format table and registered in the slot format table. In some cases, base station 105-a may signal one or more slot formats 210 (e.g., single-slot or multi-slot format indications) to UE 115-a based on an SFI table configured specific to UE 115-a, where entry indices in the SFI table include one or more format indices from the slot format table. For example, an SFI (e.g., an entry index in the SFI table) may indicate a sequence of format indices from the slot format table in a sequential order for base station 105-a and UE 115-a to utilize for multiple slots. Alternatively, an SFI may indicate one format index from the slot format table for base station 105-a and UE 115-a repetitively for subsequent slots. Each SFI may include slot formats 210 that include inactive symbols 230.

In some cases, base station 105-a may signal the SFI entry index or indices to UE 115-a for slot formats 210 via the SFI in a GC-PDCCH. Depending on the configuration, the GC-PDCCH may be specific to UE 115-a (e.g., UE-specific) or specific to a group of UEs 115 (e.g., group-specific). If the GC-PDCCH is group-specific, the SFI may represent different configurations for each UE 115 in the group based on the SFI tables being UE-specific. For example, an SFI in a first SFI table for a first UE 115 may correspond to a different slot format than the same SFI for a second SFI table for a second UE 115. Alternatively, the group-specific GC-PDCCH may indicate a common slot format for each UE 115 in the group of UEs 115. As described, inactive symbols 230 (e.g., null symbols) indicated by the SFI in the GC-PDCCH may then overwrite semi-statically assigned downlink symbols 215, uplink symbols 220, and flexible symbols 225.

Additionally, during inactive symbols 230, UE 115-a may be configured for cross cell GC-PDCCH monitoring. For example, if a first cell (e.g., Cell 1) is deactivated as indicated by inactive symbols 230 in the SFI for a certain duration (e.g., number of slots), UE 115-a may not monitor the GC-PDCCH within the first cell until the end of the duration of inactive symbols 230. However, for an early termination of the duration of inactive symbols 230, an additional SFI for the first cell may be delivered in a second cell (e.g., Cell 2) configured with GC-PDCCH monitoring. Accordingly, based on monitoring the GC-PDCCH on the second cell and receiving the additional SFI, UE 115-*a* may communicate with base station 105-*a* according to the additional SFI, which may include terminating the current duration of inactive symbols 230. In addition or as an alternative to receiving the SFI via GC-PDCCH, a UE-specific DCI format may be used to indicate the SFI.

Figure 3:
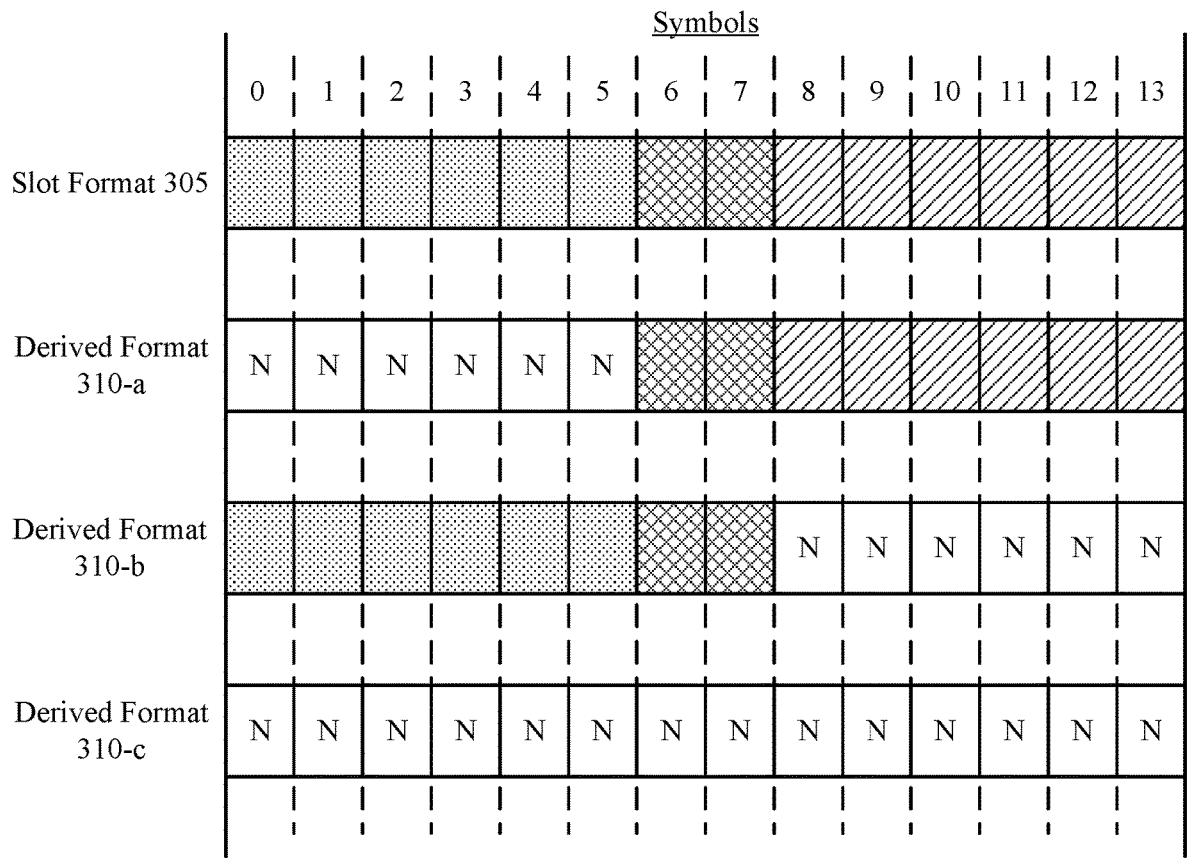
FIG. 3 illustrates an example of a slot format reconfiguration that supports cell resource management for power efficient operation in accordance with aspects of the present disclosure.

FIG. 3 illustrates an example of a slot format reconfiguration 300 that supports cell resource management for power efficient operation in accordance with aspects of the present disclosure. In some examples, slot format reconfiguration 300 may implement aspects of wireless communications systems 100 and/or 200. As described herein, a base station 105 may indicate a slot format 305 for uplink and downlink communications with a UE 115, where slot format 305 includes a combination of symbols assigned for downlink symbols 315, uplink symbols 320, flexible symbols, 325, and inactive symbols 330.

As shown in slot format reconfiguration 300, slot format 305 may represent a slot format from a slot format table (e.g., slot format index 45 as shown in Table 1) that includes downlink symbols 315, uplink symbols 320, and flexible symbols 325. Additional slot formats that include inactive symbols 330 may be derived from slot format 305, such that derived formats 310 are produced. For example, derived format 310-*a* may replace downlink symbols 315 in slot format 305 with inactive symbols 330, derived format 310-*b* may replace uplink symbols 320 in slot format 305 with inactive symbols 330, and derived format 310-*c* may replace all symbols in slot format 305 (e.g., downlink symbols 315, uplink symbols 320, and flexible symbols 325) with inactive symbols 330.

In some cases, each derived format 310 may be an additional slot format in the slot format table that the base station 105 can indicate for communications. Additionally or alternatively, each derived format 310 may be based on signaling from the base station 105, where the signaling indicates symbols to be replaced by inactive symbols 330. For example, the base station 105 may indicate a slot format that corresponds to derived format 310-*b* for upcoming communications or may signal that symbols 8-13 are to be replaced by inactive symbols 330 regardless of the initial indication for the symbols. As such, a subset of symbols of slot format 305 may be replaced by inactive symbols 330, while the rest of slot format 305 remains the same (e.g., symbols 0-2 may be replaced by inactive symbols 330). Alternatively, in some cases, the signaling to replace symbols with inactive symbols 330 may be based on the initial indication for the symbols (e.g., downlink symbols 315 in slot format 305 are to be replaced with inactive symbols 330 to determine derived format 310-*a*).

In some cases, the base station 105 may indicate slot format 305 to the UE 115 through semi-persistent signaling (e.g., broadcasted system information or RRC signaling), where the indication is based on the slot format table. The base station 105 may then change slot format 305 (e.g., based on upcoming traffic) and indicate the change through a dynamically signaled SFI (e.g., in a GC-PDCCH), where the SFI is based on an SFI table configured for the UE 115. Accordingly, derived formats 310 may be indicated by the SFI, where each derived format 310 corresponds to a slot format index in the slot format table. Alternatively, the base station 105 may dynamically signal a change in slot format 305 based on symbol indications or a symbol type through different signaling than an SFI (e.g., DCI signaling). If the derived format 310 includes inactive symbols 330, the UE 115 may suspend uplink and downlink communications on the corresponding symbols. Additionally, the UE 115 may perform a sleep-mode operation as described herein.

Alternatively, although not shown, the base station 105 may indicate an initial slot format semi-statically to the UE 115 that includes inactive symbols 330. The initial slot format may correspond to a slot format in the slot format table that includes inactive symbols 330. In some cases, the slot format that includes inactive symbols 330 may be based on existing slot formats (e.g., as shown in Table 1) with one or more assigned symbols replaced by inactive symbols 330 as described herein. Additionally or alternatively, the slot format that includes inactive symbols 330 may be configured independent of the existing slot formats. After indicating the initial slot format with inactive symbols 330, the base station 105 may dynamically change the slot format as described (e.g., SFI in a GC-PDCCH, DCI, etc.), where the changed slot format may include additional or fewer inactive symbols 330 than the initial slot format.

Figure 4:
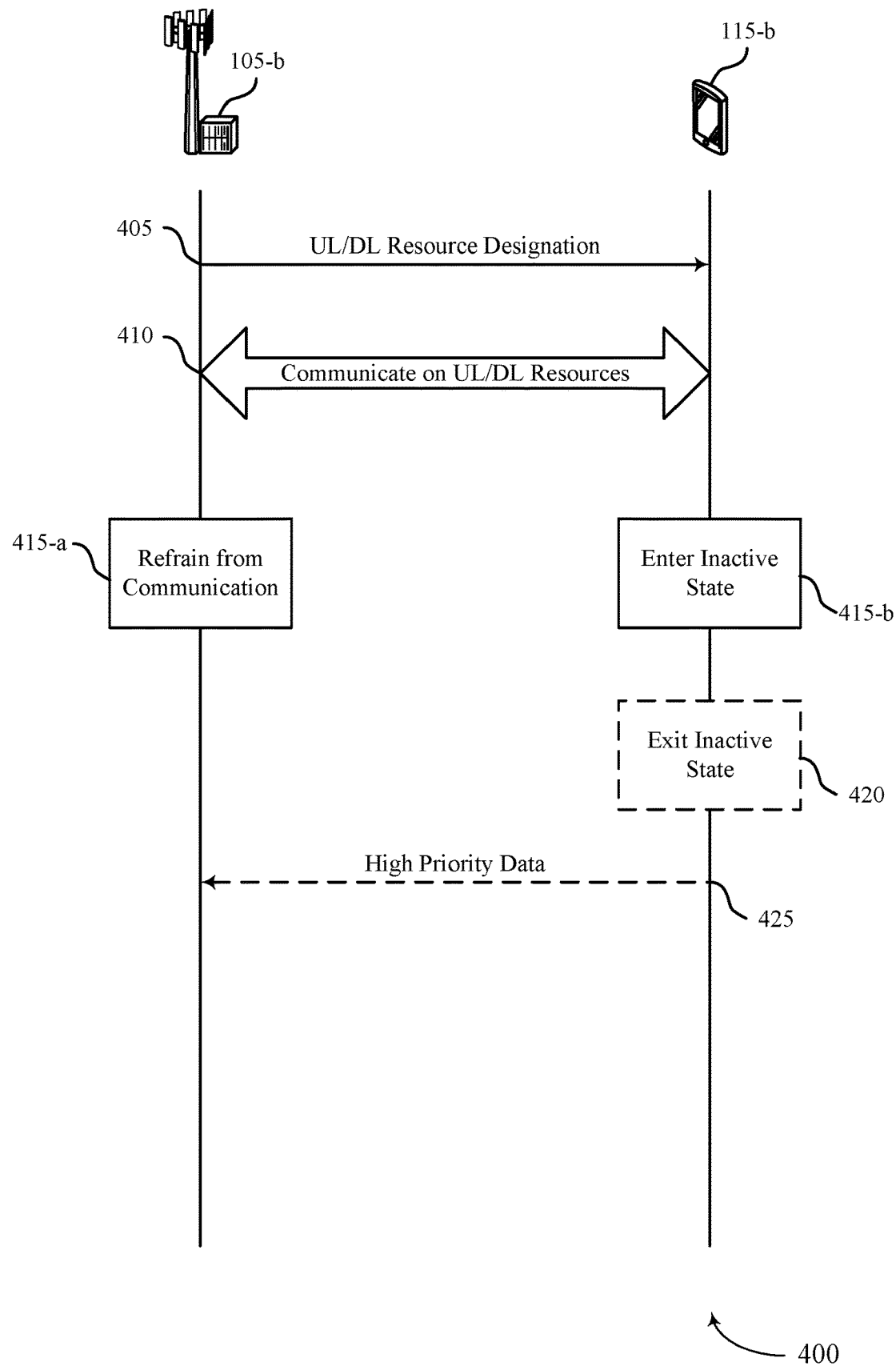
FIGS. 4 and 5 illustrate examples of process flows that support cell resource management for power efficient operation in accordance with aspects of the present disclosure.

FIG. 4 illustrates an example of a process flow 400 that supports cell resource management for power efficient operation in accordance with aspects of the present disclosure. In some examples, process flow 400 may implement aspects of wireless communications systems 100 and/or 200. Process flow 400 may include a base station 105-*b* and a UE 115-*b*, which may be examples of corresponding base stations 105 and UEs 115 as described herein with reference to FIGS. 1-3.

In the following description of the process flow 400, the operations between UE 115-*b* and base station 105-*b* may be performed in different orders or at different times. Certain operations may also be left out of the process flow 400, or other operations may be added to the process flow 400. It is to be understood that while UE 115-*b* and base station 105-*b* are shown performing a number of the operations of process flow 400, any wireless device may perform the operations shown.

At 405, UE 115-*b* may receive, from base station 105-*b*, a DL/UL resource designation for a slot, where the DL/UL resource designation includes an indication of at least one inactive duration during the slot. In some cases, UE 115-*b* may receive the DL/UL resource designation via semi-persistent signaling, dynamic signaling, or combinations thereof. For example, UE 115-*b* may receive the DL/UL resource designation via RRC signaling, via broadcasted system information, via an SFI included in a GC-PDCCH or in a UE-specific PDCCH, as an index referencing a derivation of a slot format or a sequence of slot formats identified in a slot format table, a UE-specific DL/UL resource designation, a group-specific DL/UL resource designation that is common for each UE within a group of UEs, via a UE-specific DCI message, or a combination thereof. In some cases, the SFI may include an index referencing a slot format or a sequence of slot formats identified in an SFI table. Additionally or alternatively, a format for the DCI message may be based on the indication of the at least one inactive duration during the slot to be included with the DL/UL resource designation.

At 410, UE 115-*b* and base station 105-*b* may communicate during the slot in accordance with the DL/UL resource designation. In some cases, the DL/UL resource designation for the slot may be in relation to communication between UE 115-*b* and a first cell (e.g., base station 105-*b*).

At 415, the at least one inactive duration during the slot in the DL/UL resource designation may occur, and UE 115-*b* and base station 105-*b* may enact separate procedures accordingly. For example, at 415-*a*, base station 105-*b* may refrain to communicate with UE 115-*b* during the at least one inactive duration of the slot in accordance with the DL/UL resource designation. In some cases, the refraining to communicate may include not scheduling UE 115-*b* for any uplink or downlink transmissions during the at least one inactive duration of the slot. Additionally or alternatively, at 415-*b*, UE 115-*b* may enter an inactive state during the at least one inactive duration of the slot in accordance with the indication. For example, based on entering the inactive state, UE 115-*b* may suspend DL/UL communications for the at least one inactive duration of the slot. In some cases, suspending DL/UL communications may include a sleep-mode operation initiated based on the DL/UL resource designation independent of additional sleep-mode operation parameters associated with a DRX mode operation. Additionally, based on entering the inactive state, UE 115-*b* may refrain from monitoring for scheduled PDCCH occasions during the at least one inactive duration of the slot. In some cases, UE 115-*b* may monitor a TRS, a CSI-RS, or an SS/PBCH block while in the inactive state during the at least one inactive duration during the slot in order to maintain synchronization with base station 105-*b*.

At 420, UE 115-*b* may exit the inactive state before an ending of the at least one inactive duration of the slot based on an availability of data for transmission having a priority above a threshold. Additionally or alternatively, if UE 115-*b* is communicating with more than one cell, UE 115-*b* may receive, from a second cell and during the at least one inactive duration of the slot, a message that UE 115-*b* is to exit the inactive state in relation to communication with the first cell and, accordingly, exit the inactive state. In some cases, base station 105-*b* (e.g., the first cell) may coordinate with the second cell for transmission of the message to exit the inactive state to UE 115-*b* from the second cell during the at least one inactive duration of the slot. Additionally or alternatively, UE 115-*b* may receive an additional DL/UL resource designation via an SFI included in a GC-PDCCH or in a UE-specific PDCCH, where the SFI indicates an additional at least one inactive duration for one or more symbols in the slot for the additional DL/UL resource designation. Accordingly, UE 115-*b* may overwrite the DL/UL resource designation for the slot based on receiving the additional at least one inactive duration in the additional DL/UL resource designation.

At 425, based on the availability of data for transmission having the priority above the threshold, UE 115-*b* may transmit the data whose priority is above the threshold during the at least one inactive duration of the slot.

Figure 5:
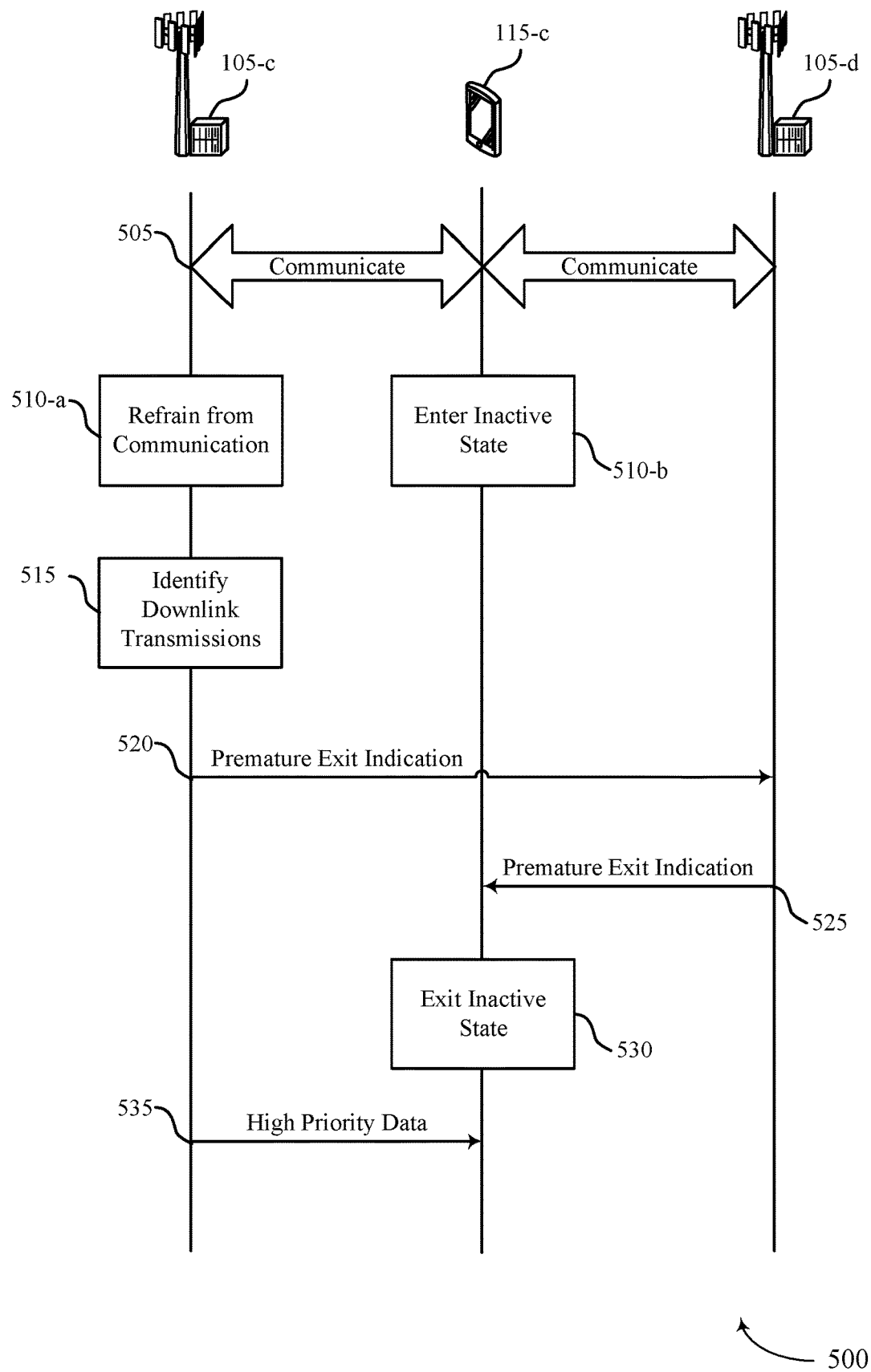

FIG. 5 illustrates an example of a process flow 500 that supports cell resource management for power efficient operation in accordance with aspects of the present disclosure. In some examples, process flow 500 may implement aspects of wireless communications systems 100 and/or 200. Process flow 500 may include a base station 105-*c*, a base station 105-*d*, and a UE 115-*c*, which may be examples of corresponding base stations 105 and UEs 115 as described with reference to FIGS. 1-4. In some cases, UE 115-*c* may be configured for CA, where simultaneous communications with base station 105-*c* (e.g., a first cell) and base station 105-*d* (e.g., a second cell) are supported. Additionally, base station 105-*c* may serve as a primary cell for UE 115-*c*, and base station 105-*d* may serve as a secondary cell. Alternatively, although not shown, UE 115-*c* may simultaneously communicate with multiple cells with different carrier frequencies on a single base station 105 as part of CA.

As described herein, base station 105-*c* may indicate a slot format configuration to UE 115-*c* for uplink and/or downlink communications with base station 105-*c*, where the slot format configuration further includes one or more inactive symbols (e.g., inactive durations of one or more symbols). In some cases, base station 105-*c* (as the primary cell) may also indicate a slot format configuration to UE 115-*c* for uplink and/or downlink communications with base station 105-*d* that may include one or more inactive symbols. Alternatively, base station 105-*d* may indicate the slot format configuration to UE 115-*c* for uplink and/or downlink communications with base station 105-*d*, where the slot format configuration may include inactive symbols. Base station 105-*c* and/or base station 105-*d* may signal the indication of the slot format configuration(s) to UE 115-*c* via semi-persistent messaging (e.g., slot format index in RRC messaging), dynamic messaging (e.g., SFI in a GC-PDCCH or DCI), or a combination thereof as described herein.

At 505, based on the CA, UE 115-*c* may be in communication with both base station 105-*c* and base station 105-*d* simultaneously.

At 510, UE 115-*c* may enter an inactive state with base station 105-*c* based on the one or more inactive symbols indicated by the slot format configuration. As described herein, the inactive state may include base station 105-*c* refraining from scheduling UE 115-*c* with uplink or downlink transmissions, and, as such, UE 115-*c* may suspend uplink and downlink communications, enter a sleep-mode operation, refrain from monitoring for scheduled PDCCH occasions, and so on. Alternatively, while in the inactive state with base station 105-*c*, UE 115-*c* may continue to be in communication with base station 105-*d*.

At 515, while still in the inactive state with UE 115-*c*, base station 105-*c* may determine that one or more downlink transmissions (e.g., high priority data transmissions) are intended for UE 115-*c*. However, since base station 105-*c* is refraining from communication with UE 115-*c* based on the inactive symbols, it is unable to transmit the downlink transmissions to UE 115-*c*.

Accordingly, at 520, since base station 105-*c*, as the primary cell, is aware that UE 115-*c* is in communication with base station 105-*d* for CA, base station 105-*c* may transmit a message to base station 105-*d* to indicate to UE 115-*c* to prematurely exit the inactive state (e.g., wake-up) in order to receive the one or more downlink transmissions. In some cases, this transmission from base station 105-*c* to base station 105-*d* may occur over a backhaul link.

At 525, base station 105-*d* may forward the message received from base station 105-*c* to UE 115-*c*. In some cases, the message may include an indication to prematurely exit the inactive state as described herein. Additionally or alternatively, the message may include a new slot format configuration that may overwrite the present slot format configuration, where the current inactive duration preventing the downlink transmissions from base station 105-*c* to UE 115-*c* is overwritten to one or more downlink symbols for a downlink duration.

At 530, based on the message received from base station 105-*d*, UE 115-*c* may exit the inactive state with base station 105-*c*. Consequently, at 535, UE 115-*c* may receive the one or more downlink transmissions from base station 105-*c*.

Figure 6:
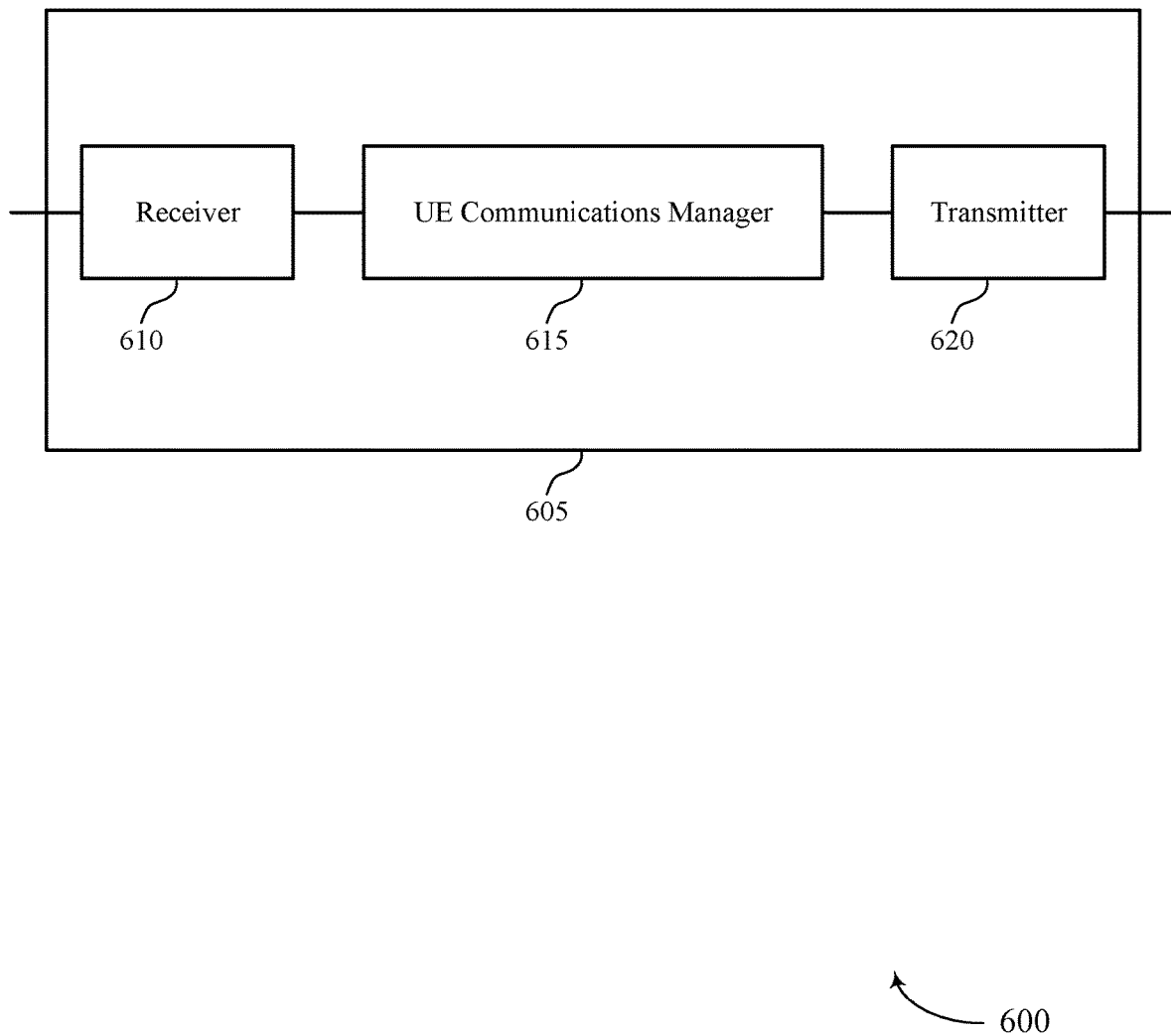
FIGS. 6 and 7 show block diagrams of devices that support cell resource management for power efficient operation in accordance with aspects of the present disclosure.

FIG. 6 shows a block diagram 600 of a device 605 that supports cell resource management for power efficient operation in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to cell resource management for power efficient operation, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive a DL/UL resource designation for a slot, where the DL/UL resource designation includes an indication of at least one inactive duration during the slot. Accordingly, the UE communications manager 615 may communicate during the slot in accordance with the DL/UL resource designation. In some cases, the UE communications manager 615 may enter an inactive state during the at least one inactive duration of the slot in accordance with the indication. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
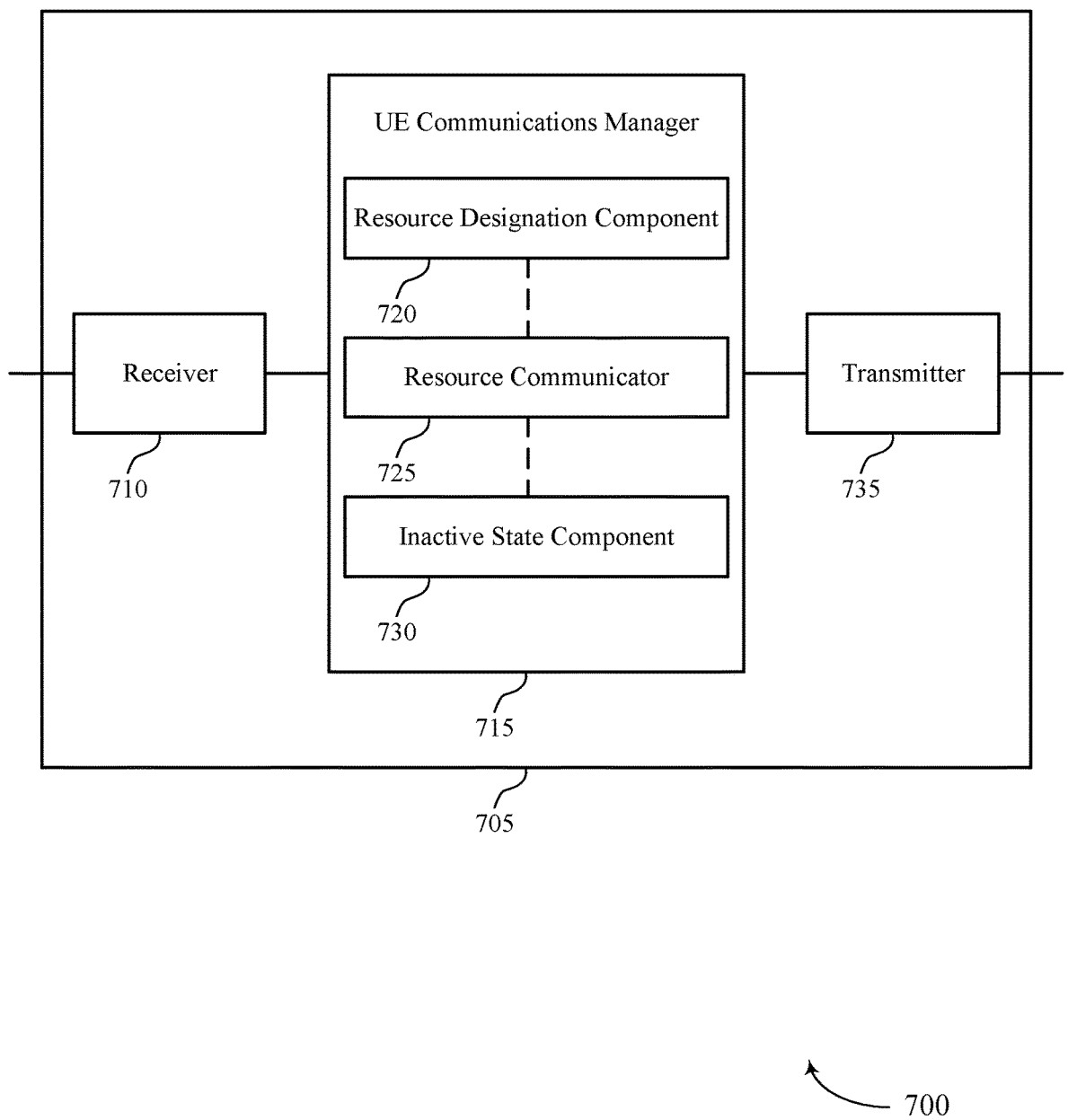

FIG. 7 shows a block diagram 700 of a device 705 that supports cell resource management for power efficient operation in accordance with aspects of the present disclosure. The device 705 may be an example of aspects of a device 605 or a UE 115 as described herein. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to cell resource management for power efficient operation, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a resource designation component 720, a resource communicator 725, and an inactive state component 730. The UE communications manager 715 may be an example of aspects of the UE communications manager 910 described herein.

The resource designation component 720 may receive a DL/UL resource designation for a slot, where the DL/UL resource designation may include an indication of at least one inactive duration during the slot.

The resource communicator 725 may communicate during the slot in accordance with the DL/UL resource designation.

The inactive state component 730 may enter an inactive state during the at least one inactive duration of the slot in accordance with the indication.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
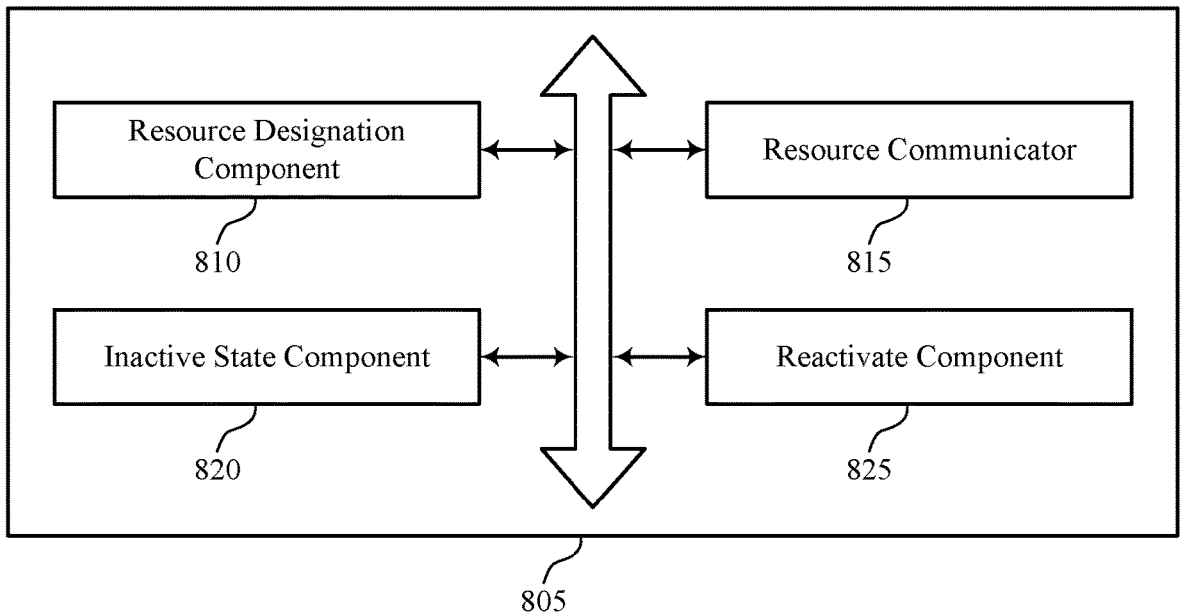
FIG. 8 shows a block diagram of a UE communications manager that supports cell resource management for power efficient operation in accordance with aspects of the present disclosure.

FIG. 8 shows a block diagram 800 of a UE communications manager 805 that supports cell resource management for power efficient operation in accordance with aspects of the present disclosure. The UE communications manager 805 may be an example of aspects of a UE communications manager 615, a UE communications manager 715, or a UE communications manager 910 described herein. The UE communications manager 805 may include a resource designation component 810, a resource communicator 815, an inactive state component 820, and a reactivate component 825. Each of these modules may communicate, directly or indirectly, with one another (e.g., via one or more buses).

The resource designation component 810 may receive a DL/UL resource designation for a slot, where the DL/UL resource designation includes an indication of at least one inactive duration during the slot. In some examples, the resource designation component 810 may receive the DL/UL resource designation via semi-persistent signaling, dynamic signaling, or combinations thereof. For example, the resource designation component 810 may receive the DL/UL resource designation via RRC signaling, via broadcasted system information, via an SFI included in a GC-PDCCH or in a UE-specific PDCCH, as an index referencing a derivation of a slot format or a sequence of slot formats identified in a slot format table, as a UE-specific DL/UL resource designation, as a group-specific DL/UL resource designation that is common for each UE within a group of UEs, via a UE-specific DCI message, or a combination thereof. In some cases, the SFI may include an index referencing a slot format or a sequence of slot formats identified in an SFI table. Additionally or alternatively, a format for the DCI message may be based on the indication of the at least one inactive duration during the slot to be included with the DL/UL resource designation.

The resource communicator 815 may communicate during the slot in accordance with the DL/UL resource designation. Additionally or alternatively, in some cases, the resource communicator 815 may receive an additional DL/UL resource designation via an SFI included in a GC-PDCCH or in a UE-specific PDCCH, where the SFI indicates an additional at least one inactive duration for one or more symbols in the slot for the additional DL/UL resource designation. Accordingly, the resource communicator 815 may overwrite the DL/UL resource designation for the slot based on receiving the additional at least one inactive duration in the additional DL/UL resource designation.

The inactive state component 820 may enter an inactive state during the at least one inactive duration of the slot in accordance with the indication. In some examples, the inactive state component 820 may suspend UL/DL communications for the at least one inactive duration of the slot. In some examples, suspending UL/DL communications includes a sleep-mode operation initiated based on the DL/UL resource designation and is independent of additional sleep-mode operation parameters associated with a DRX operation mode. Additionally or alternatively, the inactive state component 820 may refrain from monitoring for scheduled PDCCH occasions during the at least one inactive duration of the slot. In some cases, the UE may be not scheduled for any uplink or downlink transmissions during the at least one inactive duration of the slot. In some examples, the inactive state component 820 may monitor a TRS, a CSI-RS, or a SS/PBCH block during the inactive state in order to maintain synchronization with a base station.

The reactivate component 825 may exit the inactive state before an ending of the at least one inactive duration of the slot based on an availability of data for transmission having a priority above a threshold. Accordingly, the reactivate component 825 may then transmit the data whose priority is above the threshold during the at least one inactive duration of the slot. In some examples, the reactivate component 825 may receive, from a second cell and during the at least one inactive duration of the slot, a message that the UE is to exit the inactive state in relation to communication with the first cell and, as such, may exit the inactive state.

Figure 9:
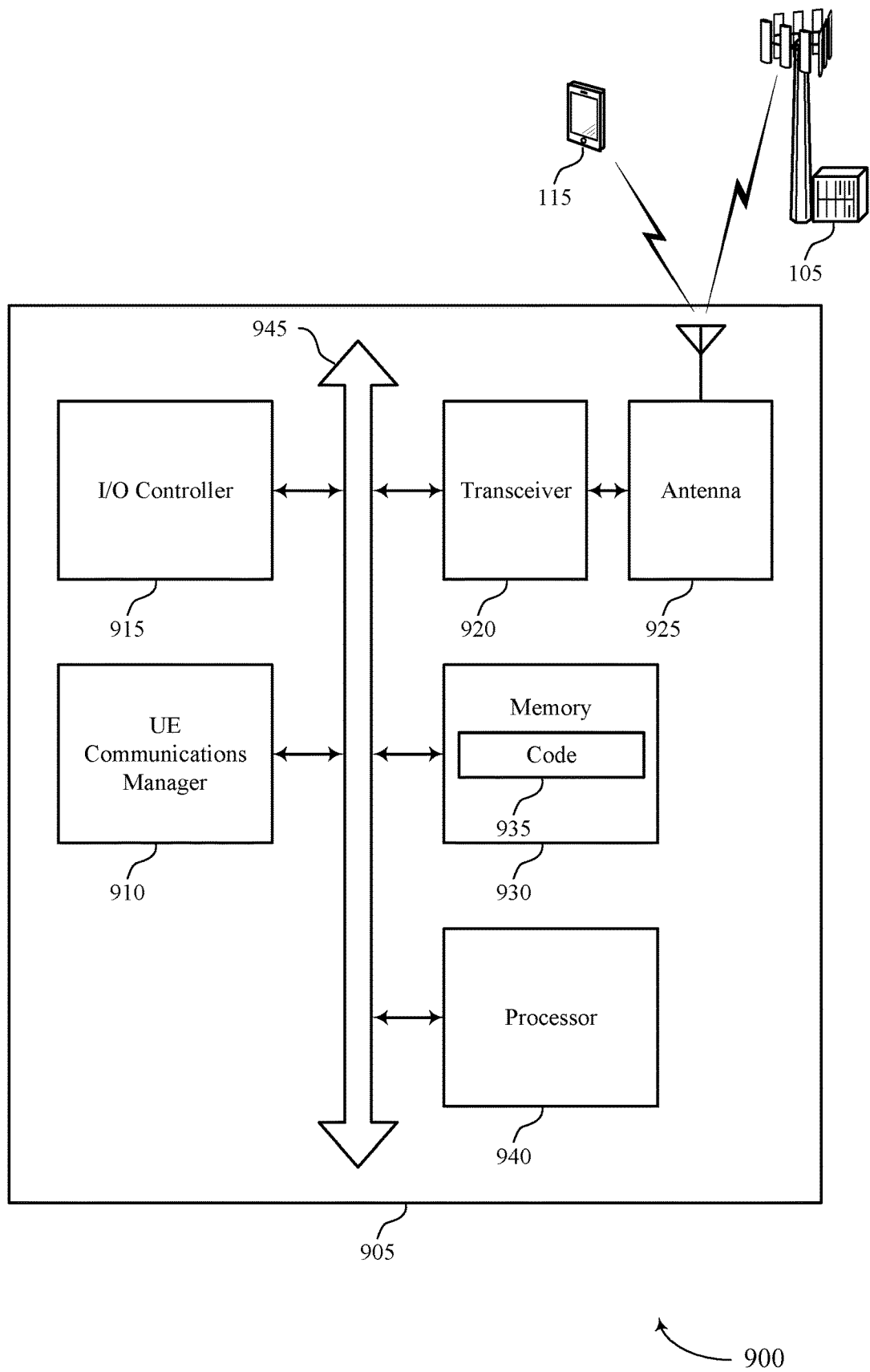
FIG. 9 shows a diagram of a system including a device that supports cell resource management for power efficient operation in accordance with aspects of the present disclosure.

FIG. 9 shows a diagram of a system 900 including a device 905 that supports cell resource management for power efficient operation in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive a DL/UL resource designation for a slot, where the DL/UL resource designation includes an indication of at least one inactive duration during the slot. Accordingly, the UE communications manager may communicate during the slot in accordance with the DL/UL resource designation. In some cases, the UE communications manager 910 may enter an inactive state during the at least one inactive duration of the slot in accordance with the indication.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting cell resource management for power efficient operation).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
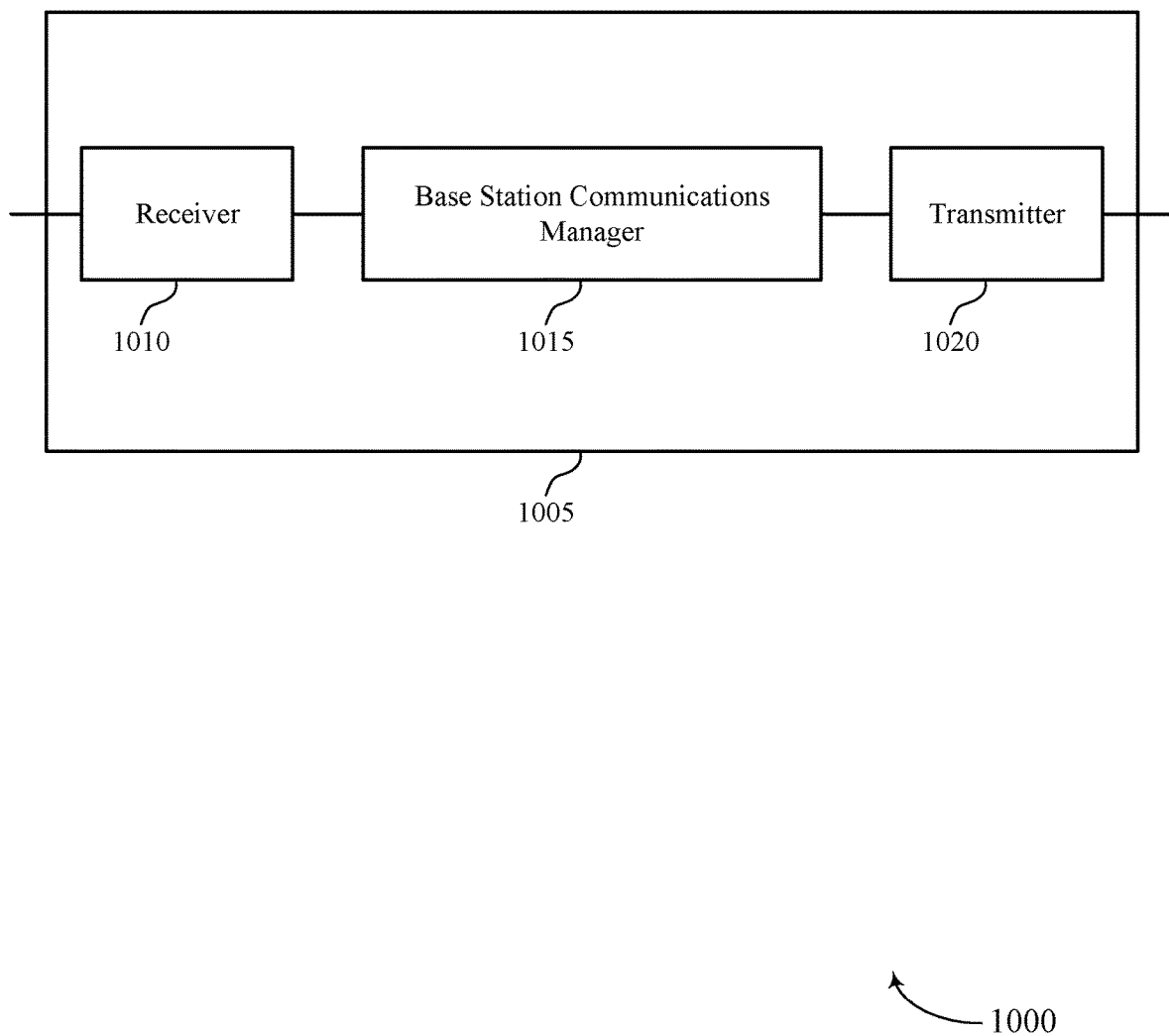
FIGS. 10 and 11 show block diagrams of devices that support cell resource management for power efficient operation in accordance with aspects of the present disclosure.

FIG. 10 shows a block diagram 1000 of a device 1005 that supports cell resource management for power efficient operation in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to cell resource management for power efficient operation, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit to a UE a DL/UL resource designation for a slot, where the DL/UL resource designation includes an indication of at least one inactive duration during the slot. Accordingly, the base station communications manager 1015 may communicate with the UE during the slot in accordance with the DL/UL resource designation. In some cases, the base station communications manager 1015 may refrain to communicate with the UE during the at least one inactive duration of the slot in accordance with the DL/UL resource designation. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
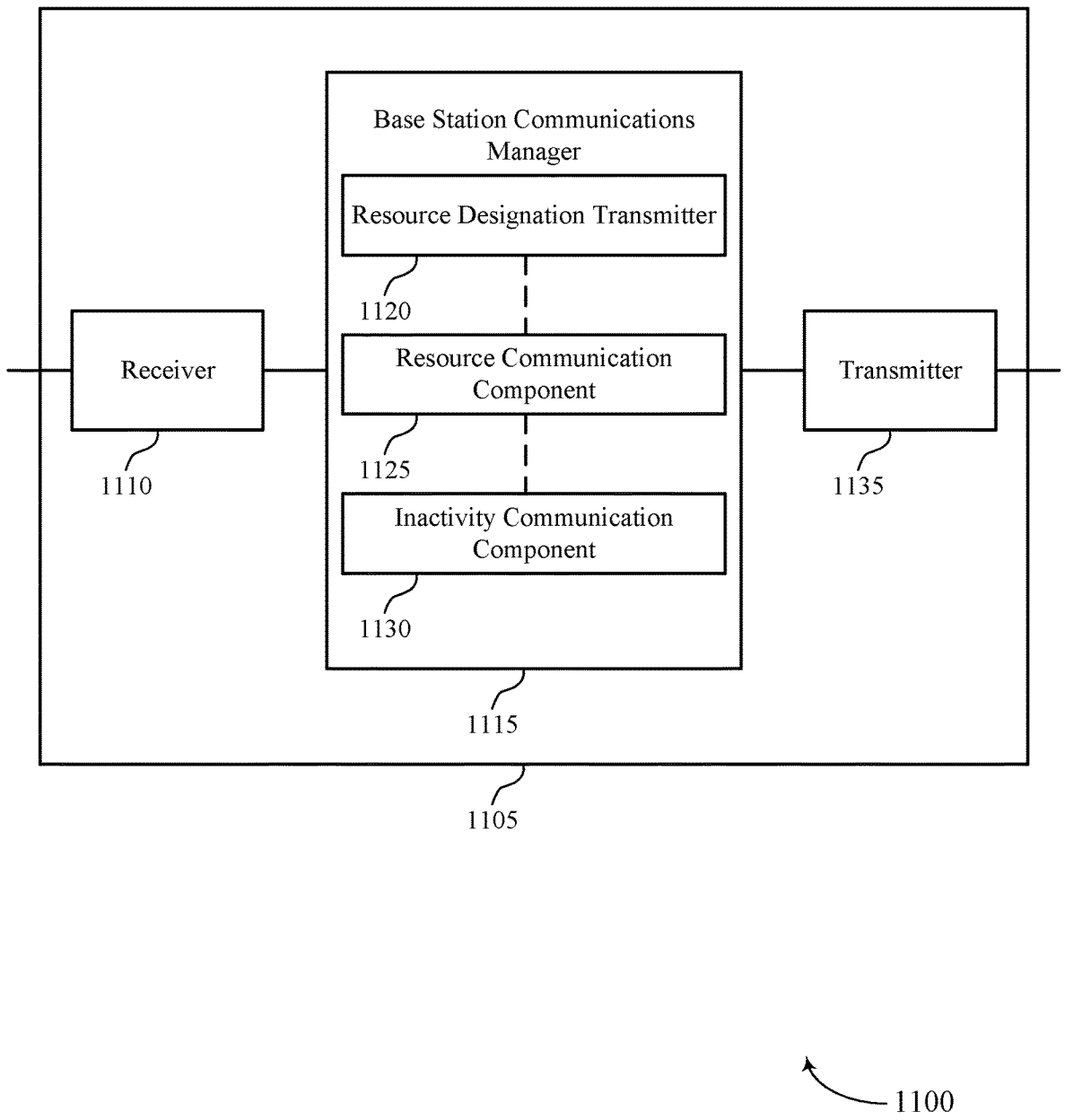

FIG. 11 shows a block diagram 1100 of a device 1105 that supports cell resource management for power efficient operation in accordance with aspects of the present disclosure. The device 1105 may be an example of aspects of a device 1005 or a base station 105 as described herein. The device 1105 may include a receiver 1110, a base station communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to cell resource management for power efficient operation, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a resource designation transmitter 1120, a resource communication component 1125, and an inactivity communication component 1130. The base station communications manager 1115 may be an example of aspects of the base station communications manager 1310 described herein.

The resource designation transmitter 1120 may transmit to a UE a DL/UL resource designation for a slot, where the DL/UL resource designation includes an indication of at least one inactive duration during the slot.

The resource communication component 1125 may communicate with the UE during the slot in accordance with the DL/UL resource designation.

The inactivity communication component 1130 may refrain to communicate with the UE during the at least one inactive duration of the slot in accordance with the DL/UL resource designation.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
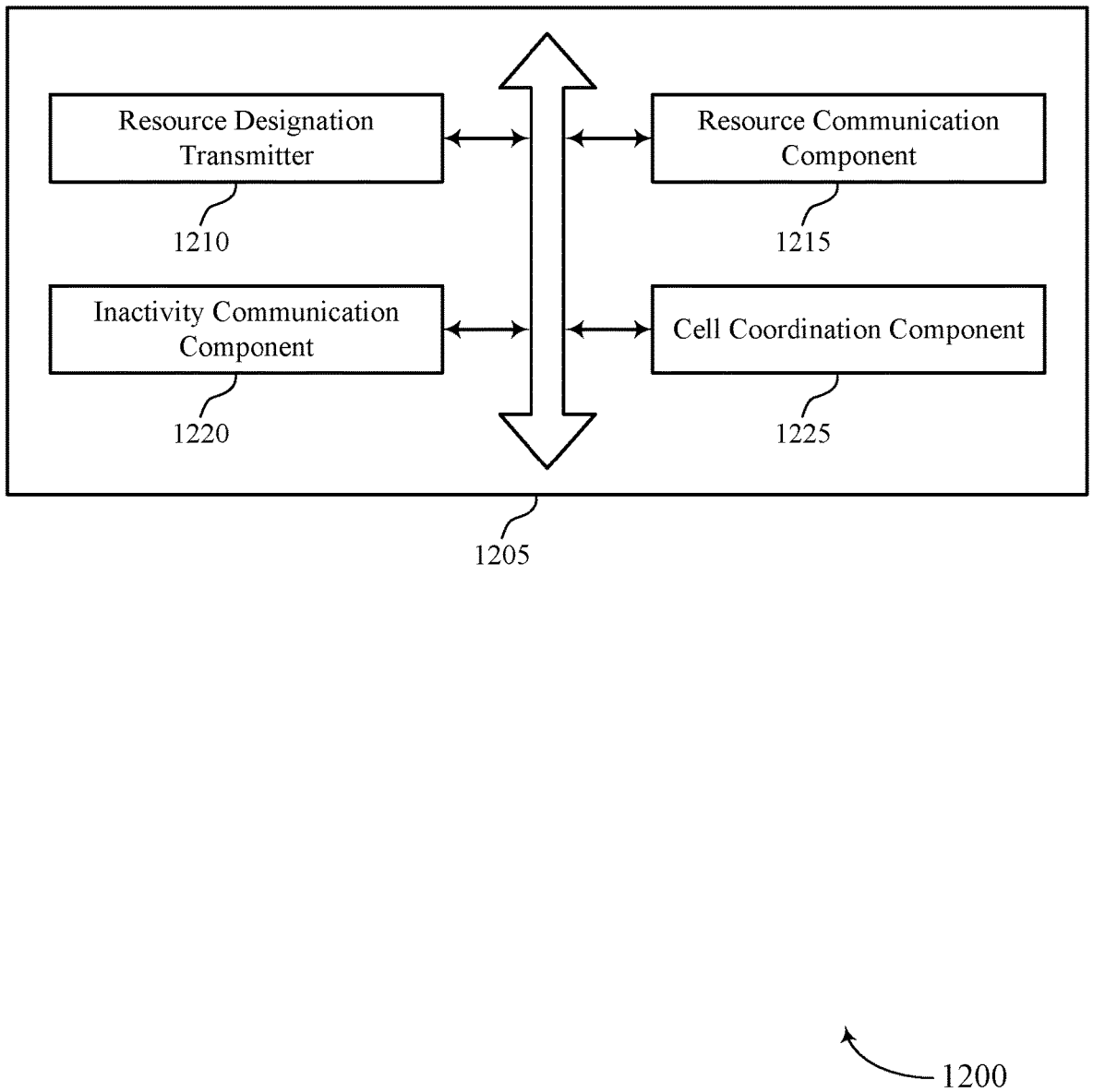
FIG. 12 shows a block diagram of a base station communications manager that supports cell resource management for power efficient operation in accordance with aspects of the present disclosure.

FIG. 12 shows a block diagram 1200 of a base station communications manager 1205 that supports cell resource management for power efficient operation in accordance with aspects of the present disclosure. The base station communications manager 1205 may be an example of aspects of a base station communications manager 1015, a base station communications manager 1115, or a base station communications manager 1310 described herein. The base station communications manager 1205 may include a resource designation transmitter 1210, a resource communication component 1215, an inactivity communication component 1220, and a cell coordination component 1225. Each of these modules may communicate, directly or indirectly, with one another (e.g., via one or more buses).

The resource designation transmitter 1210 may transmit to a UE a DL/UL resource designation for a slot, where the DL/UL resource designation includes an indication of at least one inactive duration during the slot. In some cases, the resource designation transmitter 1210 may transmit the DL/UL resource designation via semi-persistent signaling, dynamic signaling, or combinations thereof. For example, the resource designation transmitter 1210 may transmit the DL/UL resource designation via RRC signaling, via broadcasted system information, via an SFI included in a GC-PDCCH or in a UE-specific PDCCH, as an index referencing a derivation of a slot format or a sequence of slot formats identified in a slot format table, as a UE-specific DL/UL resource designation, as a group-specific DL/UL resource designation that is common for each UE within a group of UEs, via a UE-specific DCI message, or a combination thereof. In some cases, the SFI may include an index referencing a slot format or a sequence of slot formats identified in an SFI table. Additionally or alternatively, a format for the DCI may be based on the DL/UL resource designation including the indication of the at least one inactive duration during the slot.

The resource communication component 1215 may communicate with the UE during the slot in accordance with the DL/UL resource designation. Additionally or alternatively, in some cases, the resource communication component 1215 may transmit an additional DL/UL resource designation via an SFI included in a GC-PDCCH or in a UE-specific PDCCH, where the SFI indicates an additional at least one inactive duration for one or more symbols in the slot that overwrites the DL/UL resource designation for corresponding symbols.

The inactivity communication component 1220 may refrain to communicate with the UE during the at least one inactive duration of the slot in accordance with the DL/UL resource designation. In some cases, the refraining to communicate may include not scheduling the UE for any uplink or downlink transmissions during the at least one inactive duration of the slot.

The cell coordination component 1225 may coordinate with a second cell for transmission of a message to the UE from the second cell during the at least one inactive duration of the slot, the message indicating that the UE is to exit an inactive state in relation to communication with the first cell.

Figure 13:
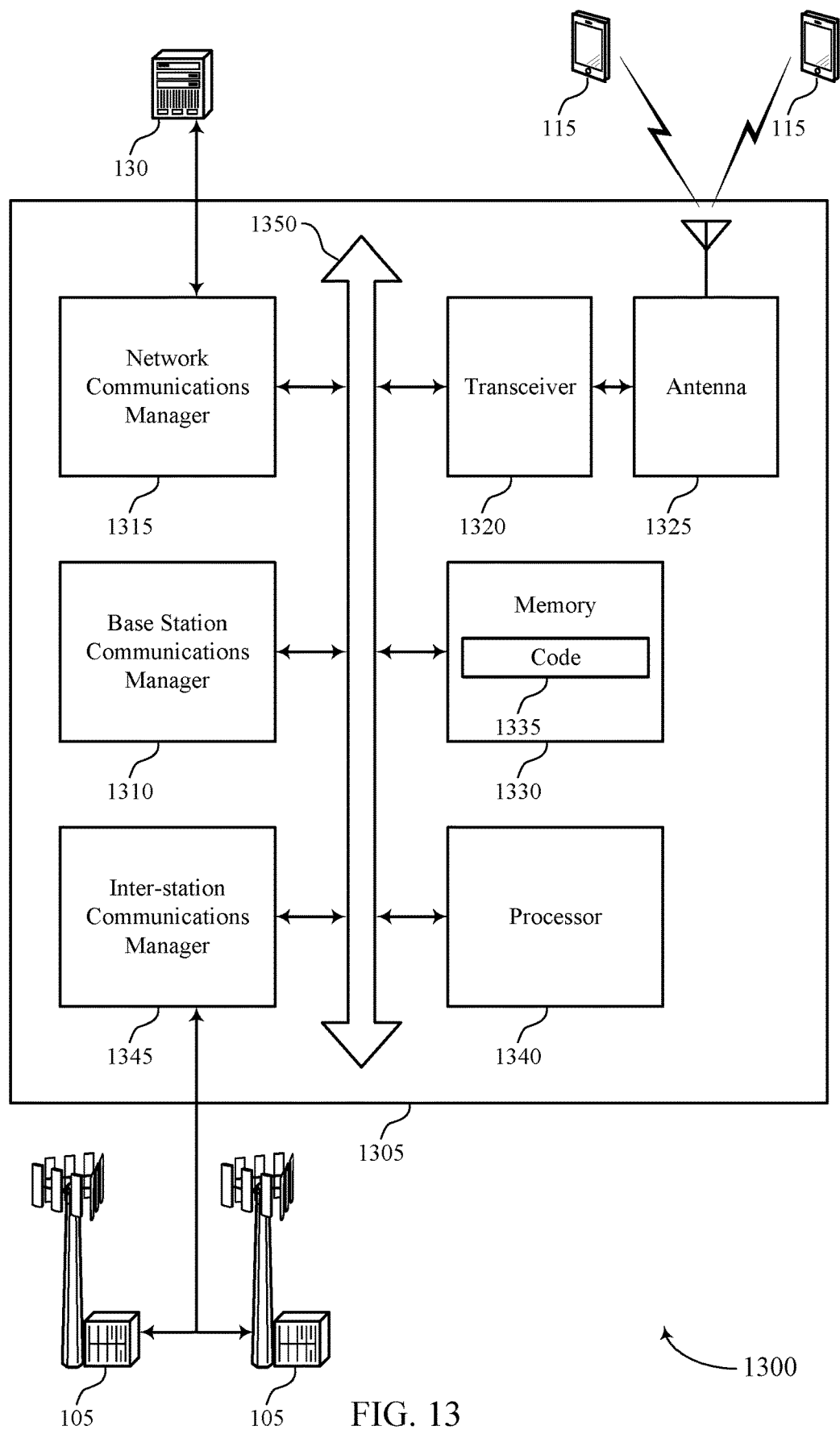
FIG. 13 shows a diagram of a system including a device that supports cell resource management for power efficient operation in accordance with aspects of the present disclosure.

FIG. 13 shows a diagram of a system 1300 including a device 1305 that supports cell resource management for power efficient operation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit to a UE, a DL/UL resource designation for a slot, where the DL/UL resource designation includes an indication of at least one inactive duration during the slot. Accordingly, the base station communications manager 1310 may communicate with the UE during the slot in accordance with the DL/UL resource designation. In some cases, the base station communications manager 1310 may refrain to communicate with the UE during the at least one inactive duration of the slot in accordance with the DL/UL resource designation.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device #{device} to perform various functions (e.g., functions or tasks supporting cell resource management for power efficient operation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
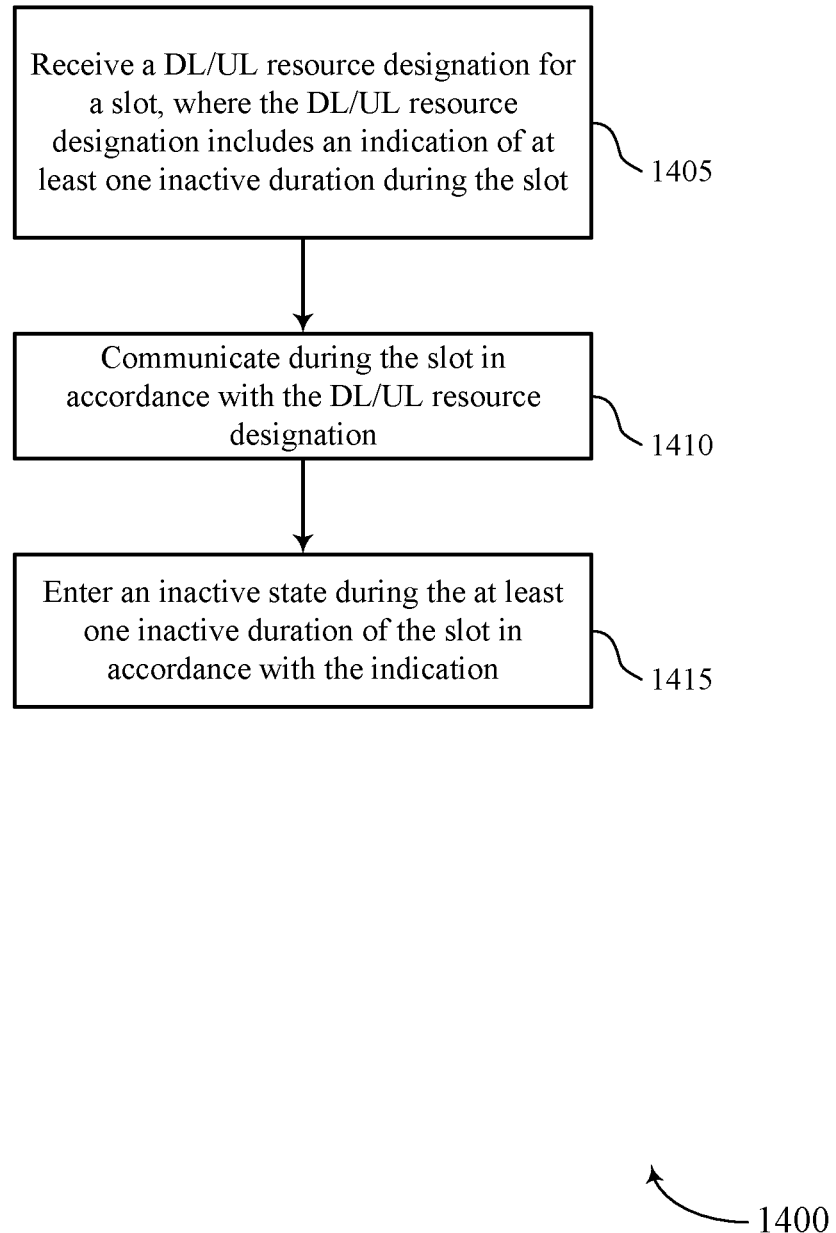
FIGS. 14 through 18 show flowcharts illustrating methods that support cell resource management for power efficient operation in accordance with aspects of the present disclosure.

FIG. 14 shows a flowchart illustrating a method 1400 that supports cell resource management for power efficient operation in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive a DL/UL resource designation for a slot, where the DL/UL resource designation includes an indication of at least one inactive duration during the slot. The operations of 1405 may be performed according to the methods described herein. In some examples, aspects of the operations of 1405 may be performed by a resource designation component as described with reference to FIGS. 6 through 9.

At 1410, the UE may communicate during the slot in accordance with the DL/UL resource designation. The operations of 1410 may be performed according to the methods described herein. In some examples, aspects of the operations of 1410 may be performed by a resource communicator as described with reference to FIGS. 6 through 9.

At 1415, the UE may enter an inactive state during the at least one inactive duration of the slot in accordance with the indication. The operations of 1415 may be performed according to the methods described herein. In some examples, aspects of the operations of 1415 may be performed by an inactive state component as described with reference to FIGS. 6 through 9.

Figure 15:
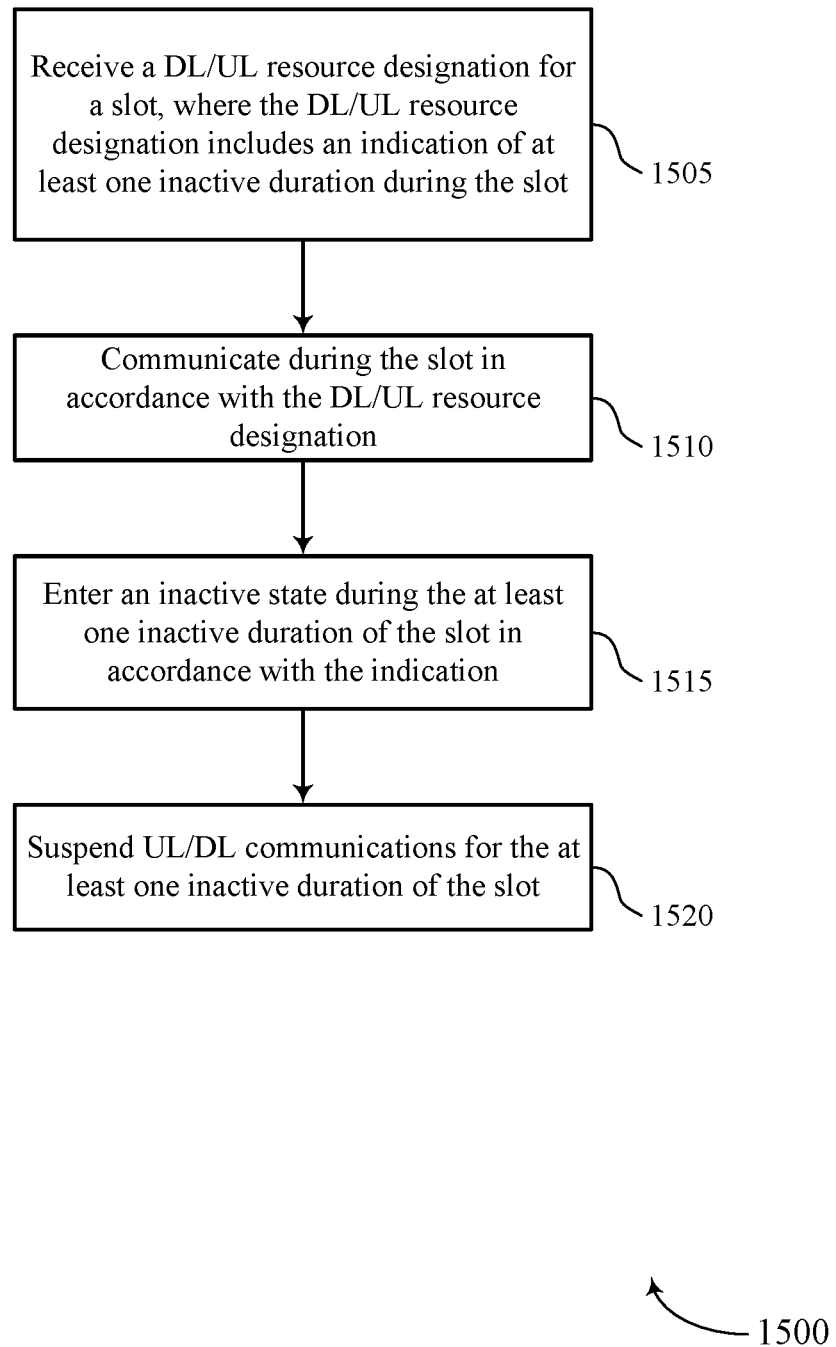

FIG. 15 shows a flowchart illustrating a method 1500 that supports cell resource management for power efficient operation in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive a DL/UL resource designation for a slot, where the DL/UL resource designation includes an indication of at least one inactive duration during the slot. The operations of 1505 may be performed according to the methods described herein. In some examples, aspects of the operations of 1505 may be performed by a resource designation component as described with reference to FIGS. 6 through 9.

At 1510, the UE may communicate during the slot in accordance with the DL/UL resource designation. The operations of 1510 may be performed according to the methods described herein. In some examples, aspects of the operations of 1510 may be performed by a resource communicator as described with reference to FIGS. 6 through 9.

At 1515, the UE may enter an inactive state during the at least one inactive duration of the slot in accordance with the indication. The operations of 1515 may be performed according to the methods described herein. In some examples, aspects of the operations of 1515 may be performed by an inactive state component as described with reference to FIGS. 6 through 9.

At 1520, the UE may suspend UL/DL communications for the at least one inactive duration of the slot. The operations of 1520 may be performed according to the methods described herein. In some examples, aspects of the operations of 1520 may be performed by an inactive state component as described with reference to FIGS. 6 through 9.

Figure 16:
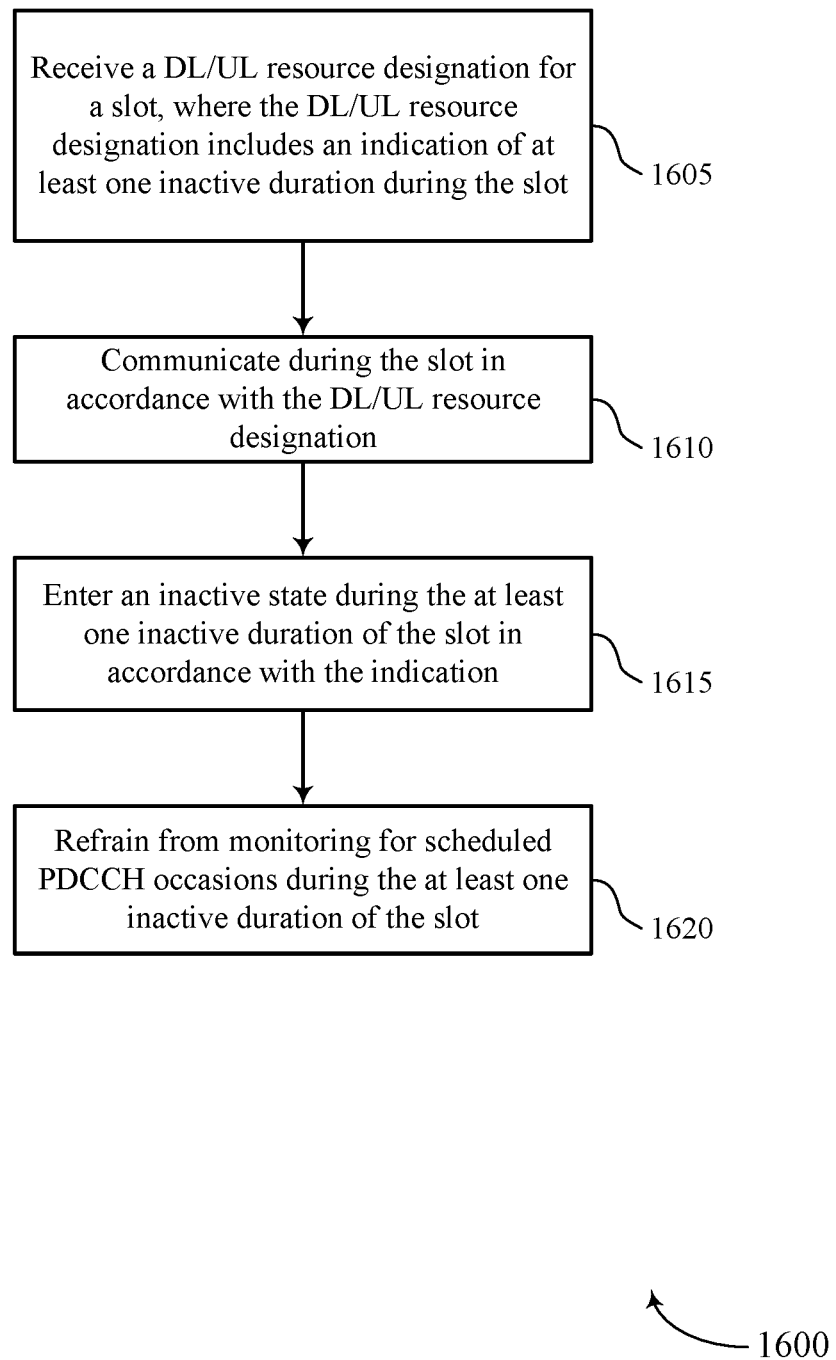

FIG. 16 shows a flowchart illustrating a method 1600 that supports cell resource management for power efficient operation in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive a DL/UL resource designation for a slot, where the DL/UL resource designation includes an indication of at least one inactive duration during the slot. The operations of 1605 may be performed according to the methods described herein. In some examples, aspects of the operations of 1605 may be performed by a resource designation component as described with reference to FIGS. 6 through 9.

At 1610, the UE may communicate during the slot in accordance with the DL/UL resource designation. The operations of 1610 may be performed according to the methods described herein. In some examples, aspects of the operations of 1610 may be performed by a resource communicator as described with reference to FIGS. 6 through 9.

At 1615, the UE may enter an inactive state during the at least one inactive duration of the slot in accordance with the indication. The operations of 1615 may be performed according to the methods described herein. In some examples, aspects of the operations of 1615 may be performed by an inactive state component as described with reference to FIGS. 6 through 9.

At 1620, the UE may refrain from monitoring for scheduled PDCCH occasions during the at least one inactive duration of the slot. The operations of 1620 may be performed according to the methods described herein. In some examples, aspects of the operations of 1620 may be performed by an inactive state component as described with reference to FIGS. 6 through 9.

Figure 17:
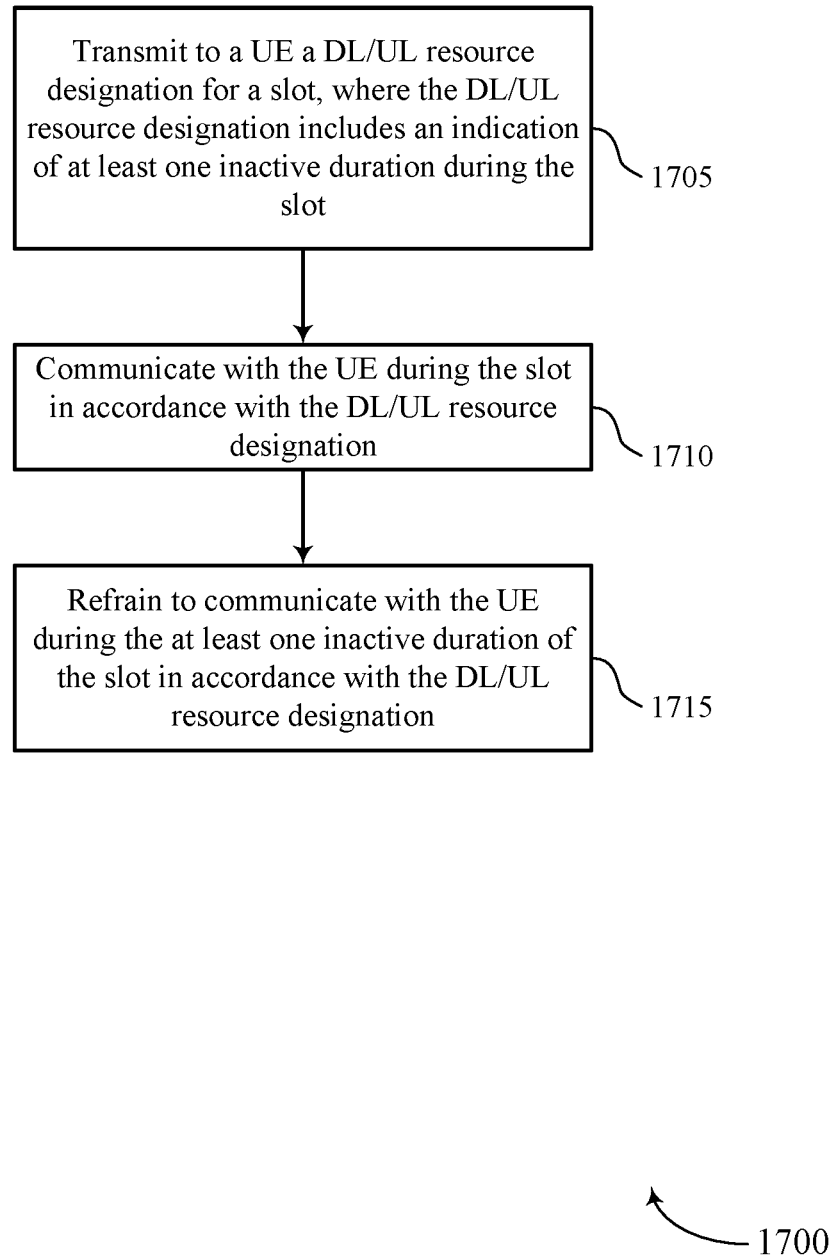

FIG. 17 shows a flowchart illustrating a method 1700 that supports cell resource management for power efficient operation in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit to a UE a DL/UL resource designation for a slot, where the DL/UL resource designation includes an indication of at least one inactive duration during the slot. The operations of 1705 may be performed according to the methods described herein. In some examples, aspects of the operations of 1705 may be performed by a resource designation transmitter as described with reference to FIGS. 10 through 13.

At 1710, the base station may communicate with the UE during the slot in accordance with the DL/UL resource designation. The operations of 1710 may be performed according to the methods described herein. In some examples, aspects of the operations of 1710 may be performed by a resource communication component as described with reference to FIGS. 10 through 13.

At 1715, the base station may refrain to communicate with the UE during the at least one inactive duration of the slot in accordance with the DL/UL resource designation. The operations of 1715 may be performed according to the methods described herein. In some examples, aspects of the operations of 1715 may be performed by an inactivity communication component as described with reference to FIGS. 10 through 13.

Figure 18:
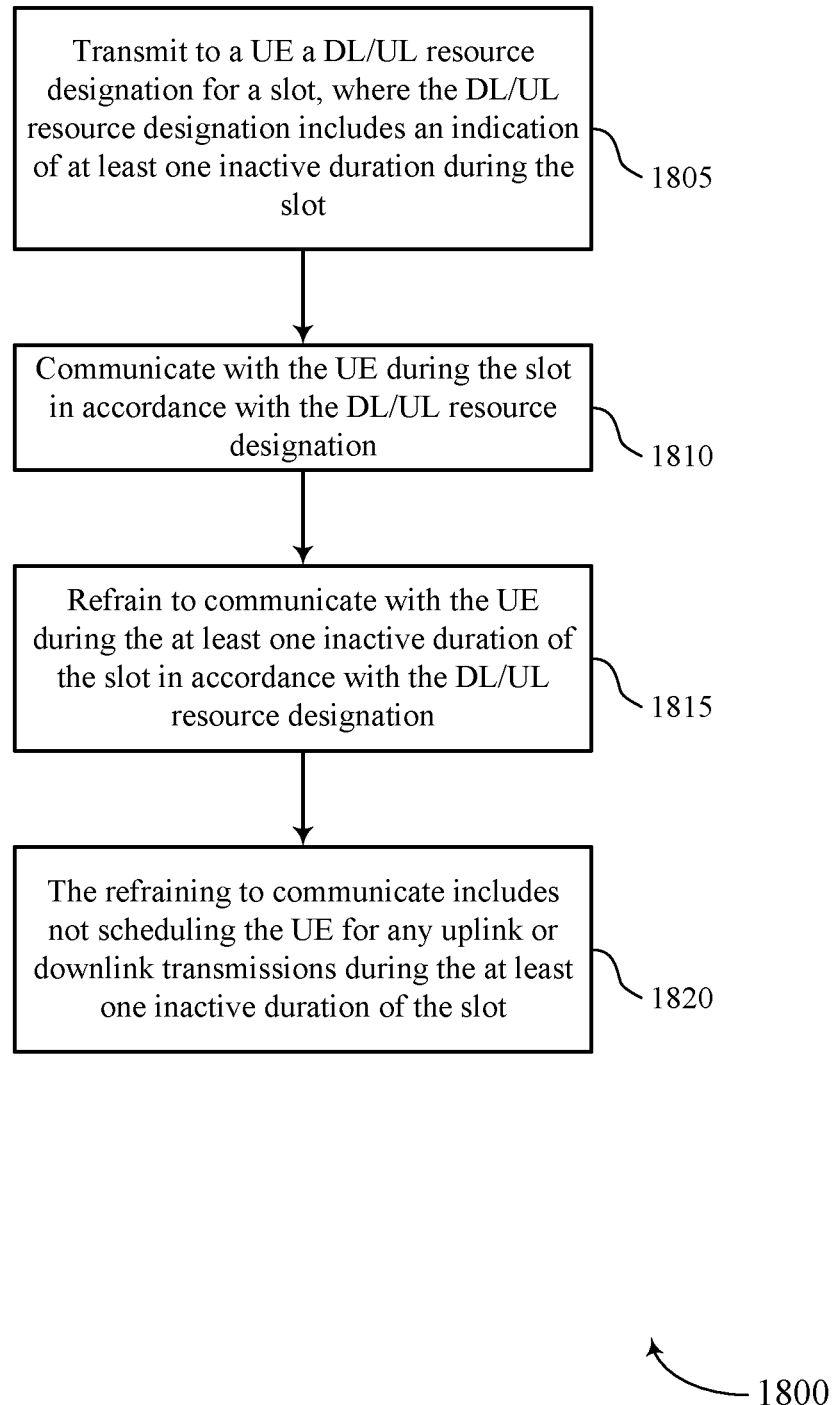

FIG. 18 shows a flowchart illustrating a method 1800 that supports cell resource management for power efficient operation in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may transmit to a UE a DL/UL resource designation for a slot, where the DL/UL resource designation includes an indication of at least one inactive duration during the slot. The operations of 1805 may be performed according to the methods described herein. In some examples, aspects of the operations of 1805 may be performed by a resource designation transmitter as described with reference to FIGS. 10 through 13.

At 1810, the base station may communicate with the UE during the slot in accordance with the DL/UL resource designation. The operations of 1810 may be performed according to the methods described herein. In some examples, aspects of the operations of 1810 may be performed by a resource communication component as described with reference to FIGS. 10 through 13.

At 1815, the base station may refrain to communicate with the UE during the at least one inactive duration of the slot in accordance with the DL/UL resource designation. The operations of 1815 may be performed according to the methods described herein. In some examples, aspects of the operations of 1815 may be performed by an inactivity communication component as described with reference to FIGS. 10 through 13.

At 1820, the base station may the refraining to communicate includes not scheduling the UE for uplink or downlink transmissions during the at least one inactive duration of the slot. The operations of 1820 may be performed according to the methods described herein. In some examples, aspects of the operations of 1820 may be performed by an inactivity communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a downlink/uplink (DL/UL) resource designation for a slot, wherein the DL/UL resource designation includes an indication of at least one inactive duration during the slot;
   communicating during the slot in accordance with the DL/UL resource designation; and
   entering an inactive state during the at least one inactive duration of the slot in accordance with the indication.

2. The method of claim 1, wherein entering the inactive state during the at least one inactive duration of the slot comprises:
   suspending DL/UL communications for the at least one inactive duration of the slot.

3. The method of claim 2, wherein suspending DL/UL communications comprises a sleep-mode operation initiated based on the DL/UL resource designation and is independent of additional sleep-mode operation parameters associated with a discontinuous reception (DRX) operation mode.

4. The method of claim 1, further comprising:
   exiting the inactive state before an ending of the at least one inactive duration of the slot based at least in part on an availability of data for transmission having a priority above a threshold; and
   transmitting the data whose priority is above the threshold during the at least one inactive duration of the slot.

5. The method of claim 1, wherein entering the inactive state during the at least one inactive duration of the slot comprises:
   refraining from monitoring for scheduled physical downlink control channel (PDCCH) occasions during the at least one inactive duration of the slot.

6. The method of claim 1, further comprising:
monitoring at least one of: a tracking reference signal (TRS), a channel state information reference signal (CSI-RS), or a synchronization signal/physical broadcast channel (SS/PBCH) block during the inactive state in order to maintain synchronization with a base station.

7. The method of claim 1, wherein the DL/UL resource designation for the slot is in relation to communication between the UE and a first cell, the method further comprising:
receiving, from a second cell and during the at least one inactive duration of the slot, a message that the UE is to exit the inactive state in relation to communication with the first cell.

8. The method of claim 1, wherein receiving the DL/UL resource designation for the slot comprises:
receiving the DL/UL resource designation via a slot format indicator (SFI) included in a group-common physical downlink control channel (GC-PDCCH) or a UE-specific PDCCH, the SFI comprising an index referencing a slot format or a sequence of slot formats identified in an SFI table.

9. The method of claim 1, wherein receiving the DL/UL resource designation for the slot comprises:
receiving the DL/UL resource designation via semi-persistent signaling, dynamic signaling, radio resource control (RRC) signaling, broadcasted system information, or combinations thereof.

10. The method of claim 1, wherein receiving the DL/UL resource designation for the slot comprises:
receiving the DL/UL resource designation as an index referencing a derivation of a slot format or a sequence of slot formats identified in a slot format table.

11. The method of claim 1, wherein receiving the DL/UL resource designation for the slot comprises:
receiving a UE-specific DL/UL resource designation.

12. The method of claim 1, wherein receiving the DL/UL resource designation for the slot comprises:
receiving a group-specific DL/UL resource designation that is common for each UE within a group of UEs.

13. The method of claim 1, wherein receiving the DL/UL resource designation for the slot comprises:
receiving the DL/UL resource designation via a UE-specific downlink control information (DCI) message, wherein a format for the UE-specific DCI message is based at least in part on the indication of the at least one inactive duration during the slot to be included with the DL/UL resource designation.

14. The method of claim 1, wherein the UE is not scheduled for any uplink or downlink transmissions during the at least one inactive duration of the slot.

15. The method of claim 1, further comprising:
receiving an additional DL/UL resource designation via a slot format indicator (SFI) included in a group-common physical downlink control channel (GC-PDCCH) or a UE-specific PDCCH, wherein the SFI indicates an additional at least one inactive duration for one or more symbols in the slot for the additional DL/UL resource designation; and
overwriting the DL/UL resource designation for the slot based at least in part on receiving the additional at least one inactive duration in the additional DL/UL resource designation.

16. A method for wireless communication at a base station, comprising:
transmitting to a user equipment (UE) a downlink/uplink (DL/UL) resource designation for a slot, wherein the DL/UL resource designation includes an indication of at least one inactive duration during the slot;
communicating with the UE during the slot in accordance with the DL/UL resource designation; and
refraining to communicate with the UE during the at least one inactive duration of the slot in accordance with the DL/UL resource designation.

17. The method of claim 16, wherein the DL/UL resource designation for the slot is for communication between the UE and the base station as a first cell, the method further comprising:
coordinating with a second cell for transmission of a message to the UE from the second cell during the at least one inactive duration of the slot, the message indicating that the UE is to exit an inactive state in relation to communication with the first cell.

18. The method of claim 16, wherein transmitting the DL/UL resource designation for the slot comprises:
transmitting the DL/UL resource designation via a slot format indicator (SFI) included in a group-common physical downlink control channel (GC-PDCCH) or a UE-specific PDCCH, the SFI comprising an index referencing a slot format or a sequence of slot formats identified in an SFI table.

19. The method of claim 16, wherein transmitting the DL/UL resource designation for the slot comprises:
transmitting the DL/UL resource designation via semi-persistent signaling, dynamic signaling, radio resource control signaling, broadcasted system information, or combinations thereof.

20. The method of claim 16, wherein transmitting the DL/UL resource designation for the slot comprises:
transmitting the DL/UL resource designation as an index referencing a derivation of a slot format or a sequence of slot formats identified in a slot format table.

21. The method of claim 16, wherein transmitting the DL/UL resource designation for the slot comprises:
transmitting a UE-specific DL/UL resource designation.

22. The method of claim 16, wherein transmitting the DL/UL resource designation for the slot comprises:
transmitting a group-specific DL/UL resource designation that is common for each UE within a group of UEs.

23. The method of claim 16, wherein transmitting the DL/UL resource designation for the slot comprises:
transmitting the DL/UL resource designation via a UE-specific downlink control information (DCI) message, wherein a format for the UE-specific DCI message is based at least in part on the indication of the at least one inactive duration during the slot to be included with the DL/UL resource designation.

24. The method of claim 16, wherein the refraining to communicate comprises not scheduling the UE for any uplink or downlink transmissions during the at least one inactive duration of the slot.

25. The method of claim 16, further comprising:
transmitting an additional DL/UL resource designation via a slot format indicator (SFI) included in a group-common physical downlink control channel (GC-PDCCH) or a UE-specific PDCCH, wherein the SFI indicates an additional at least one inactive duration for one or more symbols in the slot that overwrites the DL/UL resource designation for corresponding symbols.

26. An apparatus for wireless communication at a user equipment (UE), comprising: a processor, memory in electronic communication with the processor; and instructions stored in the memory and executable by the processor to cause the apparatus to:
    receive a downlink/uplink (DL/UL) resource designation for a slot, wherein the DL/UL resource designation includes an indication of at least one inactive duration during the slot;
    communicate during the slot in accordance with the DL/UL resource designation; and
    enter an inactive state during the at least one inactive duration of the slot in accordance with the indication.

27. The apparatus of claim 26, wherein the instructions to enter the inactive state during the at least one inactive duration of the slot are executable by the processor to cause the apparatus to:
    suspend UL/DL communications for the at least one inactive duration of the slot.

28. The apparatus of claim 26, wherein the instructions to enter the inactive state during the at least one inactive duration of the slot are executable by the processor to cause the apparatus to:
    refrain from monitoring for scheduled physical downlink control channel (PDCCH) occasions during the at least one inactive duration of the slot.

29. An apparatus for wireless communication at a base station, comprising: a processor, memory in electronic communication with the processor; and instructions stored in the memory and executable by the processor to cause the apparatus to:
    transmit to a user equipment (UE) a downlink/uplink (DL/UL) resource designation for a slot, wherein the DL/UL resource designation includes an indication of at least one inactive duration during the slot;
    communicate with the UE during the slot in accordance with the DL/UL resource designation; and
    refrain to communicate with the UE during the at least one inactive duration of the slot in accordance with the DL/UL resource designation.

30. The apparatus of claim 29, wherein the DL/UL resource designation for the slot is for communication between the UE and the base station as a first cell, the method further comprising coordinating with a second cell for transmission of a message to the UE from the second cell during the at least one inactive duration of the slot, the message indicating that the UE is to exit an inactive state in relation to communication with the first cell.

\* \* \* \* \*